United States Patent
Cheiky et al.

(10) Patent No.: US 6,919,892 B1
(45) Date of Patent: Jul. 19, 2005

(54) PHOTO REALISTIC TALKING HEAD CREATION SYSTEM AND METHOD

(75) Inventors: Michael Cheiky, Thousand Oaks, CA (US); Peter Gately, Santa Barbara, CA (US)

(73) Assignee: AvaWorks, Incorporated, Santa Monica, CA (US)

( * ) Notice: Subject to any disclaimer, the term of this patent is extended or adjusted under 35 U.S.C. 154(b) by 238 days.

(21) Appl. No.: 10/219,587

(22) Filed: Aug. 14, 2002

(51) Int. Cl.[7] .............................................. G06T 15/70
(52) U.S. Cl. ...................................................... 345/473
(58) Field of Search ......................................... 345/473

(56) References Cited

U.S. PATENT DOCUMENTS

| | | | | | |
|---|---|---|---|---|---|
| 2,711,667 | A | * | 6/1955 | Simjian ........................... | 352/4 |
| 4,276,570 | A | * | 6/1981 | Burson et al. ............... | 382/276 |
| 4,841,575 | A | * | 6/1989 | Welsh et al. ................. | 704/260 |
| 5,933,151 | A | * | 8/1999 | Jayant et al. ................ | 345/473 |
| 6,054,999 | A | * | 4/2000 | Strandberg .................. | 345/474 |
| 6,611,613 | B1 | * | 8/2003 | Kang et al. ................... | 382/118 |
| 6,654,018 | B1 | * | 11/2003 | Cosatto et al. ............... | 345/473 |
| 2001/0050689 | A1 | * | 12/2001 | Park ............................ | 345/629 |

* cited by examiner

*Primary Examiner*—Mark Zimmerman
*Assistant Examiner*—Peter-Anthony Pappas
(74) *Attorney, Agent, or Firm*—Marvin E. Jacobs

(57) ABSTRACT

A photo realistic talking head creation system and method comprising: a template; a video camera having an image output signal of a subject; a mixer for mixing the template and the image output signal of the subject into a composite image, and an output signal representational of the composite image; a prompter having a partially reflecting mirror therebetween the video camera and the subject, an input for receiving the output signal of the mixer representational of the composite image, the partially reflecting mirror adapted to allow the video camera to collect the image of the subject therethrough and the subject to view the composite image and to align the image of the subject therewith the template; storage means having an input for receiving the output image signal of the video camera representational of the collected image of the subject, and storing the image of the subject substantially aligned therewith the template.

44 Claims, 15 Drawing Sheets

PHOTO REALISTIC TALKING HEAD CREATION SYSTEM AND METHOD

BACKGROUND OF THE INVENTION

1. Field of the Invention

The present invention relates generally to talking heads and more particularly to the construction of photo realistic talking heads.

2. Background Art

Digital communications are an important part of today's world. Individuals and businesses communicate with each other via networks of all types, including the internet, each of which is typically bandwidth limited. Personal computers, hand held devices, PDA's, web-enabled cell phones, e-mail and instant messaging services, pc phones, video conferencing, and other suitable means are used to convey information between users, and satisfy their communications needs via wireless and hard wired networks. Information is being conveyed in both animated and text based formats having video and audio content, with the trend being toward animated human beings, which are capable of conveying identity, emphasizing points in a conversation, and adding emotional content. In most instances, however, photographic images of actual human beings having motion has been limited and/or of low quality, as a result of artifacts that blur the video image when compressed to reduce file size and streamed to reduce download time.

Various methods have been used to generate animated images of talking heads, which yield more personalized appearance of newscasters, for example, yet, these animated images typically lack the photo realistic quality required to convey personal identity, emphasize points in a conversation, and add emotional content, are often blurred, have poor lip synchronization, require substantially larger bandwidths than are typically available on most present day networks and/or the internet, and are difficult and time consuming to create.

News casting is a fundamental component of electronic communications media, the newscaster format being augmented by graphics and pictures, associated with news coverage, the use of animated images of talking heads, having photo realistic quality and yielding personalized appearance is one of many applications in which such talking heads may be used.

There is thus a need for a photo realistic talking head creation system and method, which allows a user to generate photo realistic animated images of talking heads, such as newscasters, quickly, easily, and conveniently. The photo realistic talking head creation system and method should yield images that have the photo realistic quality required to convey personal identity, emphasize points in a conversation, and add emotional content, show the animated photo realistic images clearly and distinctly, with high quality lip synchronization, and require less bandwidth than is typically available on most present day networks and/or the internet.

The photo realistic talking head creation system and method should be capable of capturing frames of an actual human being, and creating a library of photo realistic talking heads in different angular positions. The library of photo realistic talking heads may then be used create an animated performance of, for example, a newscaster or other such talking head having the photo realistic quality required to convey personal identity, emphasize points in a conversation, and add emotional content. The animated photo realistic images should show the animated talking head clearly and distinctly, with high quality lip synchronization, and require less bandwidth than is typically available on most present day networks and/or the internet.

The library of photo realistic talking heads should be capable of being constructed quickly, easily, and efficiently, and minimizing production time, using guides, which may be used as templates for mixing and alignment with images of an actual human being in different angular positions.

The talking heads should be capable of being used in a newscaster format, associated with news coverage, the use of animated images of talking heads, having photo realistic quality and yielding personalized appearance, for use in a number and variety of applications.

The photo realistic talking head creation system and method should also optionally be capable of creating a library of computer based two dimensional images from digital videotape footage taken of a live newscaster. An operator should be capable of manipulating a library of 3D rendered guide images or templates that are mixed with video camera output and displayed on a prompter or other suitable device to provide a template for ordered head motion. A subject or newscaster should be capable of using the guides to maintain the correct pose alignment, while completing a series of facial expressions, blinking eyes, raising eyebrows, and speaking a phrase that includes target phonemes or mouth forms. The session should optionally be capable of being recorded continuously on high definition digital videotape. An animator should optionally be capable of assembling the guide library with image editing software, using selected individual video frames containing an array of distinct head positions, facial expressions and mouth shapes that are frame by frame comparable to the referenced source video frames of the subject. Output generated with the photo realistic talking head creation system and method should be capable of being used in lieu of actual video on newscasts, and/or as an instructional aid on a personal computer, PDA or cell phone. The photo realistic talking head creation system should also be optionally capable of constructing a talking head newscast from script commands.

Different methods and apparatus for producing, creating, and manipulating electronic images, particularly associated with a head, head construction techniques, and/or a human body, have been disclosed. However, none of the methods and apparatus adequately satisfies these aforementioned needs.

U.S. Pat. No. 6,351,265 (Bulman) discloses a method of providing normalized images, comprising the steps of: (a) receiving an electronic representation of an image including a head; (b) extracting the head from the image; (c) determining a size of the head; (d) rescaling the head to a plurality of desired sizes; and (e) outputting the plurality of rescaled heads as printed images on a medium.

U.S. Pat. No. 4,276,570 (Burson, et al) discloses a method and apparatus for producing an image of a person's face at a different age, in which in order to simulate the appearance of a different age on a person's face, a picture of an old face and a corresponding young face are recorded and the differences between the old and young face found and recorded. A picture of the person's face to be simulated at a different age is then recorded, modified with the differences and the image resulting after modification is displayed.

U.S. Pat. No. 6,283,858 (Hayes, Jr., et al) discloses a system and method for manipulating images. The system includes a digital computer, input and output peripherals, and a program which provides a plurality of functions for manipulating various images. The images are processed to generate unique objects, which may be modified by an operator. The program also allows integration and data transfer to various systems including video games, other digital computers, etc. The system may be used to transfer data to the video game in order to replace characters with the actual image of the player. The system may also be used to perform animation of an image, simulate facial movement resulting from speech, and simulate cosmetic reconstruction of a body portion in real time. The program is further capable of generating three-dimensional representations of an image being manipulated.

U.S. Pat. No. 5,960,099 (Hayes, Jr., et al) discloses a system and method for producing a digitized likeness of a person. The system includes a digital computer and a scanning device operatively coupled to the digital computer. Headshot photographs of a person are scanned and the data is transmitted to the digital computer. A program is provided for manipulating the data and reconstructing a digital image for display on the digital computer. The program allows customization of the expressions on the face of the digital image. The program also allows enlargement and reduction of the digitized likeness, while maintaining necessary proportional relations. The program also allows integration and data transfer to a Computer Aided Manufacturing (CAM) system so that three dimensional contours and depressions corresponding to facial features may be automatically reproduced.

U.S. Pat. No. 4,843,568 (Krueger, et al) discloses an apparatus and method for using an image of the human body to control real time computer events. Perception and feature analysis are carried out by specialized circuitry and computer software, and response to perception is expressed using a device controllable by a computer. Participants generally are unaware of processing delays between action and reaction, and their perception of an event is similar to dealing with a human being or animate creature. Perception and response occur in real time with action and reaction closely coupled.

U.S. Pat. No. 6,044,226 (McWilliams) discloses a device and method for focusing the attention of subjects of photography. A point of interest is reflected by a reflective pane which in turn is reflected by a beam splitter, toward the subject of the photography, into an image area. Photography equipment is placed behind the beam splitter and image area. Reflection of the image at the point of interest into the image area results in focusing the attention of the photography subject to the location desired.

U.S. Pat. No. 6,084,979 (Kanade, et al) discloses a method of virtualizing reality, i.e., a method of creating a photo realistic virtual reality from images of a real event, which is comprised of the steps of capturing a plurality of images of each time instant of a real event using a plurality of cameras positioned at a plurality of angles. Each image is stored as intensity and/or color information. A suitable internal representation is computed from these images and the information regarding the camera angles. An image of each time instant may be generated from any viewing angle using the internal representation of it. The virtual viewpoints could be displayed on a single TV screen, or using a stereoscopic display device for a true three-dimensional effect. The event thus virtualized can be navigated through, and interacted with, any virtual reality system.

U.S. Pat. No. 6,278,466 (Chen) discloses an apparatus and method for creating an animation. A sequence of video images is inspected to identify a first transformation of a scene depicted in the sequence of video images. A first image and a second image are obtained from the sequence of video images, the first image representing the scene before the first transformation, and the second image representing the scene after the first transformation. Information is generated that indicates the first transformation, and that can be used to interpolate between the first image and the second image to produce a video effect that approximates display of the sequence of video images.

U.S. Pat. No. 5,995,119 (Cosatto, et al) discloses a method for generating photo realistic characters, wherein one or more pictures of an individual are decomposed into a plurality of parameterized facial parts. The facial parts are stored in memory. To create animated frames, the individual facial parts are recalled from memory in a defined manner and overlaid onto a base face to form a whole face, which, in turn, may be overlaid onto a background image to form an animated frame.

U.S. Pat. No. 6,250,928 (Poggio, et al) discloses a talking facial display method and apparatus. The method and apparatus converts input text into an audio-visual speech stream, which results in a talking face image enunciating the text. This method of converting input text into an audio-visual speech stream comprises the steps of: recording a visual corpus of a human-subject, building a viseme interpolation database, and synchronizing the talking face image with the text stream. In a preferred embodiment, viseme transitions are automatically calculated using optical flow methods, and morphing techniques are employed to result in smooth viseme transitions. The viseme transitions are concatenated together and synchronized with the phonemes, according to the timing information. The audio-visual speech stream is then displayed in real time, thereby displaying a photo realistic talking face.

U.S. Pat. No. 6,272,231 (Maurer, et al) discloses wavelet-based facial motion capture for avatar animation, which is embodied in an apparatus, and related method, for sensing a person's facial movements, features and characteristics and the like, to generate and animate an avatar image, based on facial sensing. The avatar apparatus uses an image processing technique based on model graphs and bunch graphs, that efficiently represent image features as jets. The jets are composed of wavelet transforms processed at node or landmark locations on an image corresponding to readily identifiable features. The nodes are acquired and tracked to animate an avatar image, in accordance with the person's facial movements. Also, the facial sensing may use jet similarity, to determine the person's facial features and characteristic, and, thus, allows tracking of a person's natural characteristics, without any unnatural elements that may interfere or inhibit the person's natural characteristics.

U.S. Pat. No. 6,301,370 (Steffens, et al) discloses face recognition from video images, which is embodied in an apparatus, and related method, for detecting and recognizing an object in an image frame. The object may be, for example, a head having particular facial characteristics. The object identification and recognition process uses an image processing technique, based on model graphs and bunch graphs that represent image features as jets. The jets are composed of wavelet transforms and are processed at nodes or landmark locations on an image corresponding to readily identifiable features. The system is particularly advantageous for recognizing a person over a wide variety of pose angles.

U.S. Pat. No. 6,163,322 (LaChapelle) discloses a method and apparatus for providing real-time animation utilizing a database of postures and for animating a synthetic body part. The 3D-animation system and method use a database of basic postures. In a first step, for each frame, a linear combination of the basic postures from a database of basic postures is obtained by minimizing the Euclidean distance between the displacement of critical points. The displacement information is supplied externally, and typically can be obtained by observing the displacement of physical markers placed on a moving physical body part in the real world. For instance, the synthetic body part may be an expression of a human face, and the displacement data are obtained by observing physical markers placed on the face of an actor. The linear combination of the postures in the database of postures is then used to construct the desired posture. Postures are constructed for each time frame, and are then displayed consecutively to provide animation. A computer readable storage medium containing a program element to direct a processor of a computer to implement the animation process is also provided.

U.S. Pat. No. 6,181,351 (Merrill, et al) discloses a method and apparatus for synchronizing the moveable mouths of animated characters with recorded speech. The animation of a speaking character is synchronized with recorded speech, by creating and playing a linguistically enhanced sound file. A sound editing tool employs a speech recognition engine to create the linguistically enhanced sound file from recorded speech and a text of the speech. The speech recognition engine provides timing information related to word breaks and phonemes, that are used by the sound editing tool to annotate the speech sound data, when creating the linguistically enhanced sound file. When the linguistically enhanced sound file is played to produce sound output, the timing information is retrieved to control the animated character's mouth movement and word pacing in the character's word balloon. The sound editing tool additionally provides editing functions for manipulating the timing information. A text to speech engine can use the same programming interface as the linguistically enhanced sound file player to send notifications to the animation, providing prototyping without recorded speech. Since both use the same interface, recorded speech can be incorporated at a later time with minimal modifications.

U.S. Pat. No. 5,878,396 (Henton) discloses a method and apparatus for synthetic speech in facial animation, in which facial imaging synchronized with synthetic speech. Mapping viseme images to a diphone requires the same "transitioning," in that the imaging associated with a diphone is not a static image, but rather, a series of images which dynamically depict, with lip, teeth and tongue positioning, the sound transition occurring in the relevant diphone. Each series of lip, teeth, and tongue positioning transitions is referred to in the Henton patent as a "diseme." A diseme (like a diphone), thus, begins somewhere during one viseme (phone), and ends somewhere during a following viseme (phone). Owing to lip, teeth and tongue position imaging commonality, phones are grouped into archiphonic families. A single diseme, which depicts the transition from a phone in one archiphonic family to another phone in a different archiphonic family, can be used for displaying the transition between any phone in the first archiphonic family to any phone in the second archiphonic family. In this way, the approximately 1800 diphones in General American English can be visually depicted by a relatively small number of disemes, again, due to their similarity in lip, teeth, and tongue image positioning. This results in a mapping between synthetic speech and facial imaging, which more accurately reflects the speech transitional movements of a realistic speaker image.

U.S. Pat. No. 5,983,190 (Trower, II, et al) discloses a client server animation system for managing interactive user interface characters, which provides services to enable clients to play animation and lip-synched speech output for an interactive user interface character. Through the programming interface of the server, clients can specify both speech and cursor device input that an instance of an interactive user interface character will respond to when the clients are active. Clients can also request playback of animation and lip-synched speech output through this interface. Services can be invoked from application programs, as well as web scripts embedded in web pages downloaded from the Internet.

U.S. Pat. No. 6,069,633 (Apparao, et al) discloses a sprite engine or compositor, that is well-adapted to a variety of host platforms, and that minimizes the amount of drawing that occurs on a refresh of a frame buffer display area. The invention exploits the host platform's abilities to perform both back-to-front and front-to-back drawing algorithms, where the choice of algorithm used depends upon whether a sprite is opaque or transparent. Each sprite registers itself with a sprite engine, identifying whether or not the sprite is wholly opaque or transparent, the bounding area of the sprite, and the function that the sprite uses to draw. The function can be the drawing routine that is available from the host platform or operating system. The sprite engine keeps track of the Z position of each sprite and examines each sprite to determine if the sprite overlaps a particular region that needs to be refreshed. Sprites that are rectangular and opaque are considered special cases that can be easily drawn using the host platform's front-to-back drawing algorithm. In a top-down manner, by Z position, all sprites that are opaque are allowed to be drawn. All other kinds of sprites are drawn in a back-to-front manner. When a transparent sprite is found, the sprite engine searches the remaining sprites in a bottom-up manner and draws the sprites with a Z position below the transparent sprite, finishing with the transparent sprite, using a back-to-front algorithm in the remaining region.

U.S. Pat. No. 5,933,151 (Jayant, et al) discloses a method for simulating natural movement of a computer-generated synthesized talking head, using an N-state Markov model. Initially, the number of states N is set representing N different positional orientations of the synthesized talking head. The transitions from each possible current position to each possible next position of the talking head are identified with a set of transitional probabilities in a range from zero to one. A uniformly distributed random number is generated and the state identified by the transition probabilities associated with the random number identifies the next position of the talking head. The synthesized talking head is rotated to that next position, and remains there for a durational time period, before transitioning to a next position, which is probabilistically determined in like manner. To further simulate realistic head movement, the synthesized head may be programmed to remain in a particular state or position, for an extended period of time at the end of a sentence of simulated speech.

U.S. Pat. Nos. 6,097,381 and 6,232,965 (Scott, et al) disclose methods and apparatus for synthesizing realistic animations of a human speaking, using a computer, which synthesizes speech or facial movements to match selected speech sequences. A videotape of an arbitrary text sequence is obtained, including a plurality of images of a user speaking various sequences. Video images corresponding to specific spoken phonemes are obtained. A video frame is digitized from that sequence, which represents the extreme of mouth motion and shape. This is used to create a database of images of different facial positions relative to spoken phonemes and diphthongs. An audio speech sequence is then used as the element to which a video sequence will be matched. The audio sequence is analyzed to determine spoken phoneme sequences and relative timings. The database is used to obtain images for each of these phonemes and these times, and morphing techniques are used to create transitions between the images. Different parts of the images can be processed in different ways to make a more realistic speech pattern. The U.S. Pat. No. 6,232,965 uses an audio speech sequence, as the element to which a video sequence will be matched, which is analyzed to determine spoken phoneme sequences and relative timings.

U.S. Pat. No. 6,072,496 (Guenter, et al) discloses a method and system for capturing and representing 3D geometry, color and shading of facial expressions and other animated objects. The method captures a 3D model of a face, which includes a 3D mesh and a series of deformations of the mesh, that define changes in position of the mesh over time (e.g., for each frame). The method also builds a texture map associated with each frame in an animation sequence. The method achieves significant advantages, by using markers on an actor's face to track motion of the face over time, and to establish a relationship between the 3D model and texture. Specifically, videos of an actor's face with markers are captured from multiple cameras. Stereo matching is used to derive 3D locations of the markers in each frame. A 3D scan is also performed on the actor's face with the markers to produce an initial mesh with markers. The markers from the 3D scan are matched with the 3D locations of the markers in each frame from the stereo matching process. The method determines how the position of the mesh changes from frame to frame by matching the 3D locations of the markers from one frame to the next. The method derives textures for each frame by removing the dots from the video data, finding a mapping between texture space and the 3D space of the mesh, and combining the camera views for each frame into a signal texture map. The data needed to represent facial animation includes: 1) an initial 3D mesh, 2) 3D deformations of the mesh per frame, and 3) a texture map associated with each deformation. The method compresses 3D geometry by decomposing the deformation data into basis vectors and coefficients. The method compresses the textures, using video compression.

U.S. Pat. No. 5,719,951 (Shackleton, et al) discloses a method of processing an image, including the steps of: locating within the image the position of at least one predetermined feature; extracting from the image data representing each feature; and calculating for each feature a feature vector representing the position of the image data of the feature in an N-dimensional space, such space being defined by a plurality of reference vectors, each of which is an eigenvector of a training set of like features, in which the image data of each feature is modified to normalize the shape of each feature, thereby to reduce its deviation from a predetermined standard shape of the feature, which step is carried out before calculating the corresponding feature vector.

U.S. Pat. No. 6,044,168 (Tuceryan, et al) discloses a method of model based facial coding and decoding, using feature detection and eigenface coding. The method uses a three-dimensional face model, and a technique called eigenface decomposition to analyze the video at one end. The facial feature locations and eigenface coding of the face image are sent to a decoder. The decoder synthesizes the face image at the receiving end. Eigenface decoding is used to texture map a three-dimensional model warped by detected feature locations.

U.S. Pat. No. 6,088,040 (Oda, et al) discloses a method and apparatus of facial image conversion by interpolation/extrapolation for plurality of facial expression components representing a facial image. An input/output control mechanism receives facial image information of different facial expressions of a plurality of human beings to provide control, so that a normalization processing mechanism normalizes the facial image information. A facial expression generation mechanism converts the normalized facial image information into facial expression components, and averages the facial expression components for each facial expression, to store the same as average facial expression components. The input/output control mechanism has the facial expression component converted by the facial expression generation mechanism, after the applied facial image information is normalized. The facial expression generation mechanism converts the facial expression components of the applied facial image information according to a difference between an average facial expression component corresponding to a facial expression of applied facial image information and an average facial expression component of a specified facial expression. Synthesized facial image information is generated from the converted synthesized facial expression component.

U.S. Pat. No. 6,307,576 (Rosenfeld) discloses a method for automatically animating lip synchronization and facial expression of animated characters, and in particular three dimensional animated characters, using weighted morph targets and time aligned phonetic transcriptions of recorded text. The method utilizes a set of rules, that determine system output, comprising a stream of morph weight sets, when a sequence of timed phonemes and/or other timed data are encountered. Other data, such as timed emotional state data or emotemes, such as "surprise," "disgust," "embarrassment," "timid smile,", or the like, may be inputted to affect the output stream of morph weight sets, or create additional streams.

U.S. Pat. No. 6,028,960 (Graf, et al) discloses a face feature analysis method for automatic lip reading and character animation, which begins by generating multiple face feature candidates, e.g., eyes and nose positions, using an isolated frame face analysis. Then, a nostril tracking window is defined around a nose candidate, and tests are applied to the pixels therein, based on percentages of skin color area pixels and nostril area pixels, to determine whether the nose candidate represents an actual nose. Once actual nostrils are identified, size, separation and contiguity of the actual nostrils is determined, by projecting the nostril pixels within the nostril tracking window. A mouth window is defined around the mouth region, and mouth detail analysis is then applied to the pixels within the mouth window to identify inner mouth and teeth pixels and therefrom generate an inner mouth contour. The nostril position and inner mouth contour are used to generate a synthetic model head. A direct comparison is made between the inner mouth contour generated and that of a synthetic model head, and the synthetic model head is adjusted, accordingly. Vector quantization algorithms may be used to develop a codebook of face model parameters, to improve processing efficiency. The face feature analysis is suitable, regardless of noise, illumination variations, head tilt, scale variations and nostril shape.

U.S. Pat. No. 6,069,631 (Tao, et al) discloses a method and apparatus of coding of facial animation parameters (FAPs) for transmission of synthetic talking head video over band limited channels. A FAP coding technique that realizes enough coding gain to transmit multiple synthetic talking heads over a band limited channel, without introducing perceptible artifacts into the reconstructed synthetic talking heads. This is accomplished by exploiting the spatial correlation of each FAP frame and/or the temporal correlation of the sequence of FAP frames. To remove intra-frame correlation, each FAP frame is transformed prior to segmentation from the n-dimensional space into an m-dimensional subspace, where m<n using an energy compaction transform. To remove inter-frame redundancy, the sequence is segmented, and each parameter vector is transform coded to decorrelate the vector.

U.S. Pat. No. 6,061,072 (Rouet, et al) discloses a method and apparatus for creating lifelike digital representations of computer animated objects, and in particular lifelike digital representations of three-dimensional objects. Steps and means are described, by which an animator may efficiently select and combine a plurality of animated objects to generate new animated objects. An animator may store a plurality of object shapes. To minimize storage, all of the object shapes are stored solely as differences from a base object. To form a new object, an animator may select a number of objects from the database, with the desired characteristics, and these objects will be blended with one another to create a new object, with features that are a combination of the selected objects. The extent to which a selected object is incorporated into the new object may be selected by the animator, by assigning each selected object with a weight. The new object is then a sum of each of the differences between each of the selected objects and the base object multiplied by their respective weights. An improved graphical user interface for animating facial objects is also included.

U.S. Pat. No. 5,680,481 (Prasad, et al) discloses a facial feature extraction method and apparatus for a neural network, acoustic and visual speech recognition system. The facial feature extraction method and apparatus uses the variation in light intensity (gray-scale) of a frontal view of a speaker's face. The sequence of video images are sampled and quantized into a regular array of 150×150 pixels, that naturally form a coordinate system of scan lines and pixel position along a scan line. Left and right eye areas and a mouth are located, by thresholding the pixel gray-scale and finding the centroids of the three areas. The line segment joining, the eye area centroids is bisected at right angle, to form an axis of symmetry. A straight line through the centroid of the mouth area, that is at right angle to the axis of symmetry constitutes the mouth line. Pixels along the mouth line and the axis of symmetry in the vicinity of the mouth area form a horizontal and vertical gray-scale profile, respectively. The profiles could be used as feature vectors, but it is more efficient to select peaks and valleys (maximas and minimas) of the profile, that correspond to the important physiological speech features, such as lower and upper lip, mouth corner, and mouth area positions and pixel values and their time derivatives, as visual vector components. Time derivatives are estimated by pixel position and value changes between video image frames. A speech recognition system uses the visual feature vector in combination with a concomitant acoustic vector, as inputs to a time-delay neural network.

U.S. Pat. No. 5,630,017 (Gasper, et al) discloses advanced tools for speech synchronized animation. A random access animation user interface environment, referred to as interFACE enables a user to create and control animated lip-synchronized images or objects, utilizing a personal computer for use in the users programs and products. A real-time random-access interface driver (RAVE) together with a descriptive authoring language (RAVEL) is used to provide synthesized actors ("synactors"). The synactors may represent real or imaginary persons or animated characters, objects or scenes. The synactors may be created and programmed to perform actions, including speech which are not sequentially pre-stored records of previously enacted events. Furthermore, animation and sound synchronization may be produced automatically and in real-time. Sounds and visual images of a real or imaginary person or animated character, associated with those sounds are input to a system, and may be decomposed into constituent parts to produce fragmentary images and sounds. A set of characteristics is utilized to define a digital model of the motions and sounds of a particular synactor. The general purpose system is provided for random access and display of synactor images on a frame-by-frame basis, which is organized and synchronized with sound. Both synthetic speech and digitized recording may provide the speech for synactors.

U.S. Pat. No. 4,710,873 (Breslow, et al) discloses a video game apparatus and method, which incorporates digitized images of being into game graphics, and includes an arrangement for acquiring and storing data representing an image of the face of a game player or other entity, and for selectively incorporating the image of the entity throughout the play of the game, at predetermined locations on the video game display, and in coordination with the video game graphics. In accordance with the play of the various games controlled by the video game apparatus, the stored image of one or more persons is utilized as the head of a video graphics generated body, as a portion of other generated graphics representations, as a functional game object representation, or as a controllable playing object. The video game apparatus also provides for the display of the game player image in a scoring display format, wherein the images of a predetermined number of previous game players attaining the highest scores are displayed at the beginning or end of a play of the game.

U.S. Pat. No. 6,208,359 (Yamamoto) discloses a system and method for communicating through computer animated images, which generate an animation sequence for a live character during communication. In response to a performer's voice and other inputs, the animation sequence of the character is generated on a real-time basis, and approximates human speech. The animated character is capable of expressing certain predetermined states of mind, such as happy, angry and surprised. In addition, the animated character is also capable of approximating natural movements, associated with speech.

U.S. Pat. No. 6,016,148 (Kang, et al) discloses automated mapping of facial images to animation wireframe topologies, using a method for mapping a digitized image of a face to a wireframe, which includes the steps of detecting a plurality of facial features from a plurality of pixels of a reference facial image. Equalized cropped images are compared in an image registration step. The wireframe is composed of a plurality of nodes connected by lines. Corresponding facial landmark nodes in the wireframe topology are determined. A transform between the facial features and the landmark nodes is computed to map the wireframe topology to a reference facial image. The reference facial image and a target facial image are cropped using a bounding box. The cropped reference facial image is registered with the cropped target facial image to determine a displacement field. The displacement field is applied to the mapped wireframe topology for the reference facial image to map the target facial image to the wireframe topology, the nodes being aligned with the salient facial features of the target facial image.

U.S. Pat. No. 5,774,591 (Black, et al) discloses an apparatus and method for recognizing facial expressions and facial gestures in a sequence of images. A system tracks human head and facial features over time, by analyzing a sequence of images. The system provides descriptions of motion of both head and facial features between two image frames. These descriptions of motion are further analyzed by the system to recognize facial movement and expression. The system analyzes motion between two images using parameterized models of image motion. Initially, a first image in a sequence of images is segmented into a face region and a plurality of facial feature regions. A planar model is used to recover motion parameters that estimate motion between the segmented face region in the first image and a second image in the sequence of images. The second image is warped or shifted back towards the first image, using the estimated motion parameters of the planar model, in order to model the facial features relative to the first image. An affine model and an affine model with curvature are used to recover motion parameters, that estimate the image motion between the segmented facial feature regions and the warped second image. The recovered motion parameters of the facial feature regions represent the relative motions of the facial features between the first image and the warped image. The face region in the second image is tracked using the recovered motion parameters of the face region. The facial feature regions in the second image are tracked, using both the recovered motion parameters for the face region and the motion parameters for the facial feature regions. The parameters describing the motion of the face and facial features are filtered to derive mid-level predicates that define facial gestures occurring between the two images. These mid-level predicates are evaluated over time to determine facial expression and gestures occurring in the image sequence.

U.S. Pat. No. 5,280,530 (Trew, et al) and European Patent Application No. EP474,307A2 (Trew, et al) disclose a method and apparatus for tracking a moving object in a scene, for example the face of a person in videophone applications, which comprises: forming an initial template of the face, extracting a mask outlining the face, dividing the template into a plurality (for example sixteen) subtemplates, searching the next frame to find a match with the template, searching the next frame to find a match with each of the sub-templates, determining the displacements of each of the sub-templates with respect to the template, using the displacements to determine affine transform coefficients, and performing an affine transform to produce an updated template and updated mask.

U.S. Pat. No. 5,689,575 (Sako, et al) discloses a method and apparatus for processing images of facial expressions and states of facial parts, using a television camera, a computer, and generation of facial part masks. A facial part mask unit provides masking data to both a mouth area detection unit and an eye area detection unit. The mouth area detection, the eye area detection unit, and a fingertip detection unit are connected at their outputs to the personal computer, which automatically interprets sign language signal content of received data from each of the units.

U.S. Patent Application No. 2002/0012454 (Liu, et al) discloses rapid computer modeling of faces for animation, which uses a technique for creating a 3D face model, using images obtained from an inexpensive camera associated with a general purpose computer. Two still images of the user and two video sequences are captured. The user is asked to identify five facial features, which are used to calculate a mask and to perform fitting operations. Based on a comparison of the still images, deformation vectors are applied to a neutral face model to create the 3D model. The video sequences are used to create a texture map. The process of creating the texture map references the previously obtained 3D model to determine poses of the sequential video images.

U.S. Patent Application No. 2002/0024519 (Park) discloses a system and method for producing a three-dimensional moving picture, using an authoring tool, which supports synthesis of motion, facial expression, lip synchronizing and lip synchronized voice of a three-dimensional character, comprising: a memory system adapted to store facial expression information, the shape of lips, and motion of a character; a speech information-conversion engine adapted to receive text information and/or previously recorded speech information from a user, and to convert the inputted text information and/or previously recorded speech information into corresponding speech information; a lip synchronization-creation engine adapted to extract phoneme information from speech information outputted from the speech information-conversion engine, and to generate a facial expression and the shape of the lips of the character, corresponding to the extracted phoneme information from the memory system; an animation-creation engine adapted to receive motion information from the user, and to generate movement of the character, corresponding to the motion information from the memory system; and a synthesis engine adapted to synthesize the facial expression and the lip shape of the character, generated from the lip synchronization-creation engine, and the movement of the character, generated from the animation-creation engine, to display the synthesized images on a screen. The memory system may include: a motion library adapted to store motion information of the character; a facial expression library adapted to store facial expression information of the character and shape of the lips; a background scene library adapted to store information on a background scene of the character; and a sound library adapted to store sound information.

U.S. Patent Application No. 2002/0039098 (Hirota) discloses an information processing system, which includes a first computer or communications apparatus for transmitting news information, and a second computer or communications apparatus communicating with the first computer or communications apparatus for receiving the news information; voice output means for outputting the content of the received news information; display means for displaying an animation, which imitates a speaking individual, in conformance with the output of the voice. The first computer or communications apparatus outputs the content of the news information as voice in a predetermined order, based upon the content of the received news information, and the second computer or communications apparatus displays the animation, which imitates a speaking individual, in conformance with the voice output.

Japanese Patent No. JP406129834A (Kajiwara, et al) discloses a system for determining a personal feature automatically, by digitizing a picture image of the face of a person, and determining with which feature type among the plural feature types registered previously in a control part of the image is matched by means of a neural network. Facial characteristics, such as eyes, nose, mouth, eye brows, size, and separation of the characteristics, are used.

Different apparatus and methods for displaying more than one image simultaneously on one display, and image mixing, combining, overlaying, blending, and merging apparatus and methods have been disclosed. However, none of the methods and apparatus adequately satisfies these aforementioned needs.

U.S. Pat. No. 5,583,536 (Cahill, III) discloses a method and apparatus for analog video merging and key detection, in which monochrome and color video mixers mix an overlay image with a default image to form a composite image to be displayed on a computer display. The monochrome video mixer includes a summing circuit for summing an overlay signal and a default signal to generate a composite signal. The overlay signal corresponds to the overlay image, the default signal corresponds to the default image, and the composite signal corresponds to the composite image. The video mixer includes a comparator, that has a first input for receiving the composite signal and a second input for receiving the overlay signal. The comparator compares the signal level measured at the first input with the signal level measured at the second input. In response to the comparison, the comparator provides an enable signal in the presence of a default key color signal. In response to the enable signal, an enabling circuit in the video mixer provides the overlay signal to the summing circuit. The enabling circuit provides the overlay signal to the summing circuit, when the enable signal indicates that the first input signal level is equal to the second input signal level, or, alternatively, when the first input signal level is less than the second input signal level. A color video mixer includes a number of the above-described monochrome video mixers, wherein each monochrome video mixer provides a separate output to a color gun of the display device. The overlay signal from each mixer is passed on to its respective color gun (through the mixer summing circuit) only if all the comparators (for all monochrome mixers) provide an enable signal.

U.S. Pat. No. 5,566,251 (Hanna, et al) discloses a technique for deriving a composite video image by merging foreground and background video image data supplied from a plurality of separate video signal sources employing pattern-key insertion, rather than prior-art color-key insertion, for this purpose. Pattern-key insertion involves replacing a first pattern in a video scene with a second pattern. This is accomplished by first detecting the first pattern in the video scene and estimating the pose of this detected first pattern with respect to a reference object in the video scene. The second pattern is then geometrically transformed using the pose estimate of the detected first pattern. Finally, the detected first pattern is replaced with the geometrically-transformed second pattern.

U.S. Pat. No. 6,072,933 (Green) discloses a system for the production of video signals, which includes a playback device for playing back prerecorded video and audio signals from a prerecorded storage medium, a source of user supplied video and audio signals, a video and audio mixer for combining the prerecorded and user supplied signals to provide combined video and audio outputs, a production monitor connected to the mixer to display to the user the mixed signals, and a storage or reproduction device receiving a mixed video signal output from the mixer. The prerecorded storage medium, wherein the prerecorded storage medium stores, as well as a video channel and at least one audio channel, at least one prompting channel, the video signals stored on the prerecorded medium being prekeyed to indicate areas to be overlaid in the mixer by the user supplied video signals, and the mixer being operative to convert signals from the prompting channel into production control signals.

U.S. Pat. No. 5,977,933 (Wicher, et al) discloses a display control system for portable computer drives, from a single frame buffer, for a built-in flat panel (LCD type) display, a separate external CRT display, or an NTSC/PAL television monitor. Either identical or different images may be displayed simultaneously on the CRT display or television and on the flat panel display. Independent clocking is provided to each display to enable this simultaneous display of different images as well as simultaneously display of identical images. The display control system is suitable for use with a wide variety of CRT displays and flat panel displays by means of internal programmable controls.

U.S. Pat. No. 6,271,826 (Pol, et al) discloses a method and apparatus for mixing a graphics signal and a video signal.

U.S. Pat. No. 4,713,695 (Macheboeuf) discloses a television picture superimposing system, comprising a video mixer including two variable gain amplifying circuits, which receive two input picture signals having a given peak-to-peak amplitude, and an adding circuit for mixing the amplified picture signals into a resulting picture signal. The television picture superimposing system has an improvement, which provides a circuit for deriving a single gain control signal, based upon a linear combination of two signals, derived from the two input picture signals, respectively, so that the resulting signal has the given peak-to-peak amplitude. The control signal is applied, via an analog inverting circuit, and directly to gain control inputs of the variable gain amplifying circuits, respectively.

U.S. Pat. No. 5,751,576 (Monson) discloses an animated map display, which transposes information from any of the basic or application maps of a computer-controlled agronomic system, as well as geological or environmental features, physical structures, sensor signals, status information, and other data, into a two- or three-dimensional representation that is projected using a heads-up display (HUD) overlaid onto the real-world terrain and environment visible to the operator through the windshield of the product application vehicle. The animated map display may present information relating to a particular map set as a three-dimensional image corresponding spatially to real-world terrain or environment, as well as alphanumeric, pictorial, symbolic, color, or textural indicia relating to navigational, sensor, or other data inputs. The operator may use an input interface graphically linked to the animated map display to interactively enter information, relationships, or data into the database or agronomic system.

U.S. Pat. No. 6,166,744 (Jaszlics, et al) discloses a system for combining virtual images with images of the real world. A range scanner determines the shape and distance of real-world objects within a field of interest to the observer using the apparatus. Virtual masking objects, which are simplified computer models of real-world objects, are derived from the range data. Virtual entities that are not present in the real world are simulated in an electronic computer. Images of the virtual entities and the virtual masking objects are combined into masked virtual images. The masked virtual images show the portions of virtual entities that would be visible if these entities actually existed in the real world. The masked virtual images and images of the real world scene are combined in such a manner that the virtual images appear to be obscured, when appropriate for their simulated, virtual location by real-world objects. The resulting combined image is presented in an electronic or optical display.

U.S. Pat. No. 6,262,746 (Collins) discloses a system for displaying and storing an image having transparent and non-transparent pixels, in which an image is stored as data representing the values of non-transparent pixels, and stored instructions corresponding to some pixels, resulting in a data structure. The image may be displayed by executing two types of instructions. A first type of instruction includes a command to skip pixels in a destination image. A second type of instruction comprises a command to copy pixels from the source data to the destination image.

U.S. Pat. No. 6,356,313 (Champion, et al) discloses a system for overlaying a motion video signal onto an analog signal on a display. The system includes a motion video processing unit for receiving and processing the motion video signal into a signal having an analog video format, a video format analyzer and synchronizer device for receiving the analog signal and for determining video timing parameters and a corresponding original pixel clock of the analog signal and for controlling video timing parameters of the motion video signal to match the video timing parameters of the analog signal determined by the video format analyzer and synchronizer device, so as to provide an output motion video signal which is synchronized with the analog signal, and a display determining device for determining the display of the analog output signal or the synchronized output motion video signal on the display.

U.S. Pat. No. 6,229,550 (Gloudemans, et al) discloses a system for blending a graphic, in which graphic and video are blended by controlling the relative transparency of corresponding pixels in the graphic and the video through the use of blending coefficients.

U.S. Pat. No. 6,163,309 (Weinert) discloses a heads up display and vision system or vehicle imaging system for producing an integrated video image of a scene about a vehicle.

U.S. Pat. No. 5,956,180 (Bass, et al) discloses an optical viewing system for producing multiple image displays, which comprises a first screen for displaying a first two-dimensional image on a first electronic display device at a first predetermined distance from an observer and a second screen for displaying a second two-dimensional image on a second electronic display device at a second predetermined distance from the observer. Each of the screens is located at different predetermined locations on an optical viewing path relatively nearer to and farther from the observer. The first two-dimensional image is projected through the second screen, creating a multiple overlaid picture image. The first and second electronic display devices are operable asynchronously without degrading the multiple overlaid picture images. The screen disposed in the optical viewing path at the predetermined location nearer to the observer is partially transparent.

U.S. Pat. No. 5,589,980 (Bass, et al) discloses an optical viewing system for producing a simulated three dimensional image. The system includes electronic equipment for displaying an image on a first electronic display device. Additional electronic equipment is provided for displaying an image on at least one second display device. The at least one second electronic display device is a substantially transparent display device, whereby an observer can view through transparent areas of the second electronic display device. The first and second electronic display devices are located at different, predetermined locations along an optical viewing path such that the image displayed by the first electronic display device is projected through the second electronic display device. The first electronic display device includes an image projector and the second electronic display device includes a controllable pixel display spaced therefrom. The controllable pixel display is comprised of a positive pixel display panel having a field of pixel elements which are controllably illuminated. The controllable pixel display is substantially transparent, such that the image produced by the controllable pixel display is overlaid upon the image produced by the image projector. A recording system including at least two image recorder channels is also disclosed for producing a plurality of images for simulating a three dimensional scene.

U.S. Pat. No. 5,982,452 (Gregson, et al) discloses an analog video merging system for merging N video signals from N video cameras, and more particularly to a system that can take the output of a plurality of video cameras, and form a combined video signal which can be fed to a computer having only a single frame grabber card. This system is used to track targets using multiple video cameras, and is comprised of an analog video merging apparatus for merging N video signals from N video cameras. The apparatus is comprised of N video processors, each of which N processors are connected to the N video cameras in a one-to-one correspondence, wherein each of the N video processors compares the video signal associated with one of the N video cameras with a dynamic predetermined threshold level, and produces a binary output signal having a low level and a high level, the low level being output if the associated video signal is below the predetermined threshold, and the high level being output if the associated video signal is above the predetermined threshold. N binary combiners are provided, with each being connected to the N video processors in a one-to-one correspondence. Each of the combiners produces a processed binary signal having a low level and a high level, the low level being output in the presence of a low level output from the associated video processor, and a high level being output in the presence of a high level from the associated video processor, wherein the high level of the processed binary signal is a unique level to that particular binary combiner, such that a unique high level is output from the N binary combiners that are associated with the N video cameras. The processed binary signal for camera N is scaled by a factor of $2.^{N-1}$ with respect to the other camera signals. A summing unit is provided for summing N processed binary signals from the N binary combiners to produce a merged video signal. A method of providing a merged video signal is also provided.

U.S. Pat. No. 5,519,450 (Urbanus, et al) discloses a graphics subsystem for overlaying a graphics sub display on a main video image, which shows an SLM-based digital display system, having a graphics display subsystem for closed captioning, on-screen displays, and other graphics images that are overlaid on the video image. The graphics display subsystem has a graphics processor that prepares the graphics data, which is inserted into the video data path after video data processing and prior to a look-up table unit. A select logic unit provides a control signal to a multiplexer, that selects between video data and graphics data for input to the look-up table unit. The look-up table unit performs its mapping according to the type of data received, such as by linearizing video data or palletizing graphics data.

U.S. Pat. No. 4,262,302 (Sexton) discloses a digital computing system having a monolithic microprocessor, a versatile input/output subsystem, a multimedium capability. In the memory subsystem, a balanced mix of dynamic RAM, P-channel MOS ROM and N-channel MOS ROM are included, to minimize cost without sacrificing performance. In the video display subsystem, a monolithic video display processor performs all RAM access functions, in addition to composite video generation. The resultant composite video signal, which may include audio and external video information, can be applied directly to a video monitor or RF modulated for use by a television receiver.

U.S. Pat. No. 4,243,984 (Ackley, et al) discloses a digital computing system having a monolithic microprocessor, a versatile input/output subsystem, a multi-medium memory subsystem, and a video display subsystem with audio generating capability. In the memory subsystem, a balanced mix of dynamic RAM, P-channel MOS ROM and N-channel MOS ROM. In the video display subsystem, a monolithic video display processor performs all RAM access functions, in addition to composite video generation. The resultant composite video signal, which may include audio and external video information, can be applied directly to a video monitor or RF modulated for use by a television receiver.

U.S. Pat. No. 5,579,028 (Takeya) discloses an apparatus for mixing a play video signal with graphics video signal. The play video signal is derived by playing a recording medium, and the graphics video signal is derived on the basis of data processing. A video selecting signal generated on the basis of image data is delayed, where its delay time is adjustable. By issuing image data for testing, the delay time is manually or automatically adjusted so as to coincide at a time at which the video image selecting signal is generated, on the basis of the image data for testing, with a time at which the image data for testing is converted to a graphics video signal and issued.

U.S. Pat. No. 5,487,145 (Marsh, et al) discloses a method and apparatus for compositing display items, which minimizes locked drawing areas. A compositing architecture provides for correct rendering of overlapping opaque and translucent regions of respective graphic images with rapid pixel restoration, when an image floating above another image is moved or manipulated to reveal pixels of a graphic image at a greater depth, by provision for buffering data corresponding to a portion of a graphic image, which is beneath another graphic image. Data representing graphic images is selectively routed to a painter in response to a determination of opacity and depth order of the graphic images. A plurality of painters are preferably provided, with image rendering pipeline of differing lengths. A painter is chosen in accordance with the number of images to be composited. Data buffering is minimized by dynamic creation and removal of buffers, in accordance with the intersecting regions of the graphic images.

U.S. Pat. No. 5,416,497 (Nishi, et al) discloses a video display control system, which displays a multicolor animation pattern on a screen of a video display unit. The video display control system is mainly constructed by a video RAM (VRAM) and a video display processor (VDP). The VRAM stores animation pattern data, display position data and at least two color data. The VDP reads these data and makes an animation pattern image displayed in at least two colors at a display position on the screen. The animation pattern image, two colors and display position are determined by the animation pattern data, two color data and display position data. In another video display control system, the VRAM stores at least two sets of animation pattern data, display position data and color data. When displaying two animation patterns, the VDP effects a logical operation on the two color data, with respect to the overlapping portion of the two patterns and makes the overlapping portion displayed in a new color corresponding to the operation result. When the animation patterns overlaps, the VDP can also deliver a collision signal in place of the logical operation, thereby enabling a CPU to recognize the position of the overlapping portion.

U.S. Pat. No. 5,892,521 (Blossom, et al) discloses a system and method for composing a display frame of multiple layered graphic sprites, which includes a graphics display device, for displaying a display frame comprising a plurality of display frame pixels. A sprite management system composes the display frame from a plurality of graphic sprites. Each graphic sprite comprises a plurality of sprite pixels and corresponding sprite pixel values. Each sprite has a specified depth relative to the other sprites. One of the sprites is designated to be a video sprite. This sprite is loaded with a chroma-key value. The sprite management system includes a data processing device connected to access a display frame composition buffer. The data processing device is programmed to write pixel values of individual sprites to the display frame composition buffer. This writing begins with the pixel values of the sprite having the greatest depth and proceeds with the pixel values of the remaining sprites in order of decreasing sprite depth. The display frame data is then passed to a video overlay board which overlays a video image over those pixels containing the chroma-key value. The result is a display frame, in which the plurality of graphic sprites, including the video sprite, appear layered with respect to each other, in accordance with their respectively specified depths.

U.S. Pat. No. 6,362,850 (Alsing, et al) discloses a method and system for interactively creating a movie from a still image in a digital imaging device that includes a display screen, which includes determining a path of panning across the still image, generating image frames along the path of panning, and then displaying the image frames for a predetermined time interval on the display screen to play the movie.

U.S. Pat. No. 5,404,437 (Nguyen) and European Patent Application No. EP597616A1 (Nguyen) disclose an apparatus and method for mixing animation sequences with computer graphics information for presentation on a computer display screen. The animation sequences may be stored in compressed format in a standard storage medium. An animation sequence generator retrieves the compressed animation sequences, decompresses them into pixel information, and sends them to a single line store for synchronization with the computer graphics pixel information. Pixels from the animation sequences and from the computer graphics generator are mixed, windowed and overlaid in a digital mixer. The output of the digital mixer is sent to a visual display system such as a video digital-to-analog converter driving a computer display monitor.

U.S. Pat. No. 2,711,667 (Simjian) discloses a prompting device for a person posing in front of a moving picture camera, a television camera, or similar apparatus, in which visual prompting information is made available to the person posing, but rendered invisible to such audio-visual recording apparatus.

Different image alignment and registration methods and apparatus have been disclosed. However, none of the methods and apparatus adequately satisfies these aforementioned needs.

U.S. Pat. No. 6,009,212 (Miller, et al) discloses an apparatus and method for image registration involves computing a first transform based on landmark manifolds, using a distance measure, computing a second transform from the distance measure and the first transform. Registering the images is accomplished by applying the second transform.

U.S. Pat. No. 6,157,747 (Szeliski, et al) discloses a 3-dimensional image rotation method and apparatus for producing image mosaics, which align a set of plural images to construct a mosaic image.

U.S. Pat. No. 5,926,190 (Turkowski, et al) discloses a system and method for simulating motion in an interactive computer application wherein images of a scene are used to render views of the scene from particular viewpoints. The method and system includes registering a first image and a second image, using a transformation that overlays common features of both the first and the second image. After the two images are registered, at least one intermediate image is generated by applying a first interpolated transformation to the first image and a second interpolated transformation to the second image. The first image, the intermediate image, and the second image are then sequentially rendered to simulate motion through the scene.

U.S. Pat. No. 6,314,197 (Jain, et al) discloses a system and method for determining alignment parameters (rotation angle and translation vector) between two images of a scene, in particular fingerprint images, based on the attributes of segments associated with a pair of corresponding points, each point extracted from each of the images.

U.S. Pat. No. 6,349,153 (Teo) discloses a method and system for composition of two digital images, which overlap in an overlapping pixel region, including adjusting the pixel color values of at least one of the digital images, so as to produce resulting digital images including at least one modified digital image, and combining the resulting digital images in the overlapping pixel region by taking weighted averages of their pixel color values. There is also described a method for feathering two digital images which overlap in an overlapping pixel region, including aligning the digital images, so as to approximately register them in the overlapping pixel region, determining three curves, one of which is a leftmost curve, another of which is a middle curve and another of which is a rightmost curve, and at least one of which is not a straight vertical line, the curves extending from the top to the bottom of the overlapping pixel region and lying within the overlapping pixel region, and the middle curve lying between the leftmost and the rightmost curve, and combining the digital images by taking a weighted average of the pixel color values, in such a way that the weights used are a value above 50% of image A and a value below 50% of image B to the left of the leftmost curve, 50% of image A and 50% of image B along the middle curve, and a value below 50% of image A and a value above 50% of image B to the right of the rightmost curve. Systems for carrying out the methods are also described.

U.S. Pat. No. 6,205,364 (Lichtenstein, et al) discloses a method and apparatus for controlling a processing machine to perform a processing operation on a work piece by (a) determining the nominal locations of at least two sensible reference marks on the work piece in terms of the coordinates of the work piece; (b) loading the work piece on the processing machine; (c) sensing, and measuring the actual locations of, the reference marks on the work piece when so mounted, in terms of the coordinates of the processing machine; (d) determining at least one geometrical transformation needed to transform the work piece coordinates of the nominal locations of the reference marks to the processing machine coordinates of the actual locations of the reference marks; (e) and controlling the processing machine in accordance with the determined geometrical transformation.

U.S. Pat. No. 6,362,797 (Dehmlow) discloses an apparatus and method for aligning portions of a tiled projection display, which become misaligned during operation of the display, including interposing at least one two-dimensionally electro-mechanically gimballed glass plate in the projection path of one of the display sections, sensing the misalignment of the tiles and automatically adjusting the alignment in response thereto, and further having apparatus and steps for alignment of the tiles, based upon operational characteristics of an aircraft upon which the display is used.

U.S. Pat. Nos. 5,835,194 and 5,959,718 (Morton) each disclose apparatus and methods for aligning and printing integral images.

For the foregoing reasons, there is a need for a photo realistic talking head creation system and method, which allows a user to generate photo realistic animated images of talking heads, such as newscasters, quickly, easily, and conveniently. The photo realistic talking head creation system and method should yield images that have the photo realistic quality required to convey personal identity, emphasize points in a conversation, and add emotional content, show the animated photo realistic images clearly and distinctly, with high quality lip synchronization, and require less bandwidth than is typically available on most present day networks and/or the internet.

The photo realistic talking head creation system and method should be capable of capturing frames of an actual human being, and creating a library of photo realistic talking heads in different angular positions. The library of photo realistic talking heads may then be used create an animated performance of, for example, a newscaster or other such talking head having the photo realistic quality required to convey personal identity, emphasize points in a conversation, and add emotional content. The animated photo realistic images should show the animated talking head clearly and distinctly, with high quality lip synchronization, and require less bandwidth than is typically available on most present day networks and/or the internet.

The library of photo realistic talking heads should be capable of being constructed quickly, easily, and efficiently, and minimizing production time, using guides, which may be used as templates for mixing and alignment with images of an actual human being in different angular positions.

The talking heads should be capable of being used in a newscaster format, associated with news coverage, the use of amimated images of talking heads, having photo realistic quality and yielding personalized appearance, for use in a number and variety of applications.

The photo realistic talking head creation system and method should also optionally be capable of creating a library of computer based two dimensional images from digital videotape footage taken of a live newscaster. An operator should be capable of manipulating a library of 3D rendered guide images or templates that are mixed with video camera output and displayed on a prompter or other suitable device to provide a template for ordered head motion. A subject or newscaster should be capable of using the guides to maintain the correct pose alignment, while completing a series of facial expressions, blinking eyes, raising eyebrows, and speaking a phrase that includes target phonemes or mouth forms. The session should optionally be capable of being recorded continuously on high definition digital videotape. An animator should optionally be capable of assembling the guide library with image editing software, using selected individual video frames containing an array of distinct head positions, facial expressions and mouth shapes that arc frame by frame comparable to the referenced source video frames of the subject. Output generated with the photo realistic talking head creation system and method should be capable of being used in lieu of actual video on newscasts, and/or as an instructional aid on a personal computer, PDA or cell phone. The photo realistic talking head creation system should also be optionally capable of constructing a talking head newscast from script commands.

SUMMARY

The present invention is directed to a photo realistic talking head creation system and method, which allows a user to generate photo realistic animated images of talking heads, such as newscasters, quickly, easily, and conveniently. The photo realistic talking head creation system and method yields images that have the photo realistic quality required to convey personal identity, emphasize points in a conversation, and add emotional content, show the animated photo realistic images clearly and distinctly, with high quality lip synchronization, and requires less bandwidth than is typically available on most present day networks and/or the internet.

The photo realistic talking head creation system and method is capable of capturing frames of an actual human being, and creating a library of photo realistic talking heads in different angular positions. The library of photo realistic talking heads may then be used create an animated performance of, for example, a newscaster or other such talking head having the photo realistic quality required to convey personal identity, emphasize points in a conversation, and add emotional content. The animated photo realistic images show the animated talking head clearly and distinctly, with high quality lip synchronization, and require less bandwidth than is typically available on most present day networks and/or the internet.

The library of photo realistic talking heads is capable of being constructed quickly, easily, and efficiently, and minimizing production time, using guides, which may be used as templates for mixing and alignment with images of an actual human being in different angular positions.

The talking heads are capable of being used in a newscaster format, associated with news coverage, the use of animated images of talking heads, having photo realistic quality and yielding personalized appearance, for use in a number and variety of applications.

The photo realistic talking head creation system and method of the present invention mixes or combines a human subject's head and a guide or template, so as to allow the human subject to view the image of his or her own head, and to align his or her head image with the guide.

Upon proper alignment, the image of the human subject's head is stored. The process is repeated for different head tilt, swivel, and nod positions, and a library or library of photo realistic talking heads is, thus, constructed and stored. Additionally, the human subject utters selected sounds and makes selected eye movements, i.e. closes and opens the eyes, at each of the head positions, resulting in changes in mouth and eye shapes, and changes in facial expressions, cropped images of the human subject's mouth and eyes additionally being stored for each of the selected utterances and eye movements.

The guides, which are images, are used as reference guides or templates for assisting the human subject in maneuvering his or her head into a plurality of positions. The guide and an image of the human subject's head are mixed or combined, so as to allow the human subject to view the image of his or her own head, and to align his or her head image with the guide. Upon proper alignment, the image of the human subject's head is stored. Additionally, the human subject utters selected sounds and makes selected eye movements, i.e. closes and opens the eyes, at each of the head positions, resulting in changes in mouth and eye shapes, and changes in facial expressions, cropped images of the human subject's mouth and eyes additionally being stored for each of the selected utterances and eye movements. The process is repeated for different head tilt, swivel, and nod positions, and the library of photo realistic talking heads is, thus, constructed and stored. The library of photo realistic talking heads may be used for creating highly detailed talking head newscasters for internet based applications. Image mixing and alignment means assist the human subject in aligning his or her head with the guide.

The photo realistic talking head creation system and method can be used to create a library of computer based two-dimensional images from digital videotape footage taken of a live newscaster. The resulting talking head library, assembled with image editing software, using selected individual video frames, contains an array of distinct head positions, facial expressions and mouth shapes that is frame by frame comparable with the referenced source video frames of the same subject. Output generated with the photo realistic talking head creation system and method can be used instead of actual video on newscasts and can instruct a personal computer, PDA or cell phone to construct a talking head newscast from a series of script commands.

The photo realistic talking head creation system and method of the present invention is capable of capturing and creating personal photo talking head libraries suitable for use with imbedded web content, animated e-mail, Internet messaging services, PDA's, cell phones and other wireless communication devices. The photo realistic talking head creation system and method enables users to use capture software and an input from a digital video camera, or computer-based video camera to create a photo realistic talking head library. Automated image editing software may be used to assist the user with identifying and cropping target frames for inclusion in the photo realistic talking head library.

The photo realistic talking head creation system and method may also optionally be used to create a library of computer based two dimensional images from digital videotape footage taken of a live newscaster. An operator can manipulate a library of 3D rendered guide images or templates that are mixed with video camera output and displayed on a prompter or other suitable device to provide a template for ordered head motion. A subject or newscaster may use the guides to maintain the correct pose alignment, while completing a series of facial expressions, blinking eyes, raising eyebrows, and speaking a phrase that includes target phonemes or mouth forms. The session is optionally capable of being recorded continuously on high definition digital videotape. An animator can optionally assemble the talking head library with image editing software, using selected individual video frames containing an array of distinct head positions, facial expressions and mouth shapes that are frame by frame comparable to the referenced source video frames of the subject. Output generated with the photo realistic talking head creation system and method may used in lieu of actual video on newscasts, and/or as an instructional aid on a personal computer, PDA or cell phone. The photo realistic talking head creation system may be used to optionally construct a talking head newscast from script commands.

A device for constructing a photo realistic talking head having features of the present invention comprises: a template; a video camera having means for collecting an image of a subject, the video camera having an output signal representational of the collected image of the subject; a mixer, the mixer having an input for receiving the template and an input for receiving the output signal of the video camera representational of the collected image of the subject, means for mixing the received template and the received output signal of the video camera representational of the collected image of the subject into a composite image, and an output signal representational of the composite image; a prompter, the prompter having a partially reflecting mirror, the partially reflecting mirror therebetween the video camera image collecting means and the subject, the prompter having an input for receiving the output signal of the mixer representational of the composite image, the partially reflecting mirror adapted to allow the video camera to collect the image of the subject therethrough and the subject to view the composite image and the subject to align the image of the subject therewith the template; storage means, the storage means having an input for receiving the output signal of the video camera representational of the collected image of the subject, and storing the image of the subject substantially aligned therewith the template.

A method of constructing a photo realistic talking head having features of the present invention comprises at least the following steps: substantially aligning an image of a subject with an image of a template; storing the image of the substantially aligned subject, the stored image representing a frame of a talking head.

DRAWINGS

These and other features, aspects, and advantages of the present invention will become better understood with regard to the following description, appended claims, and accompanying drawings where:

Figure 2:
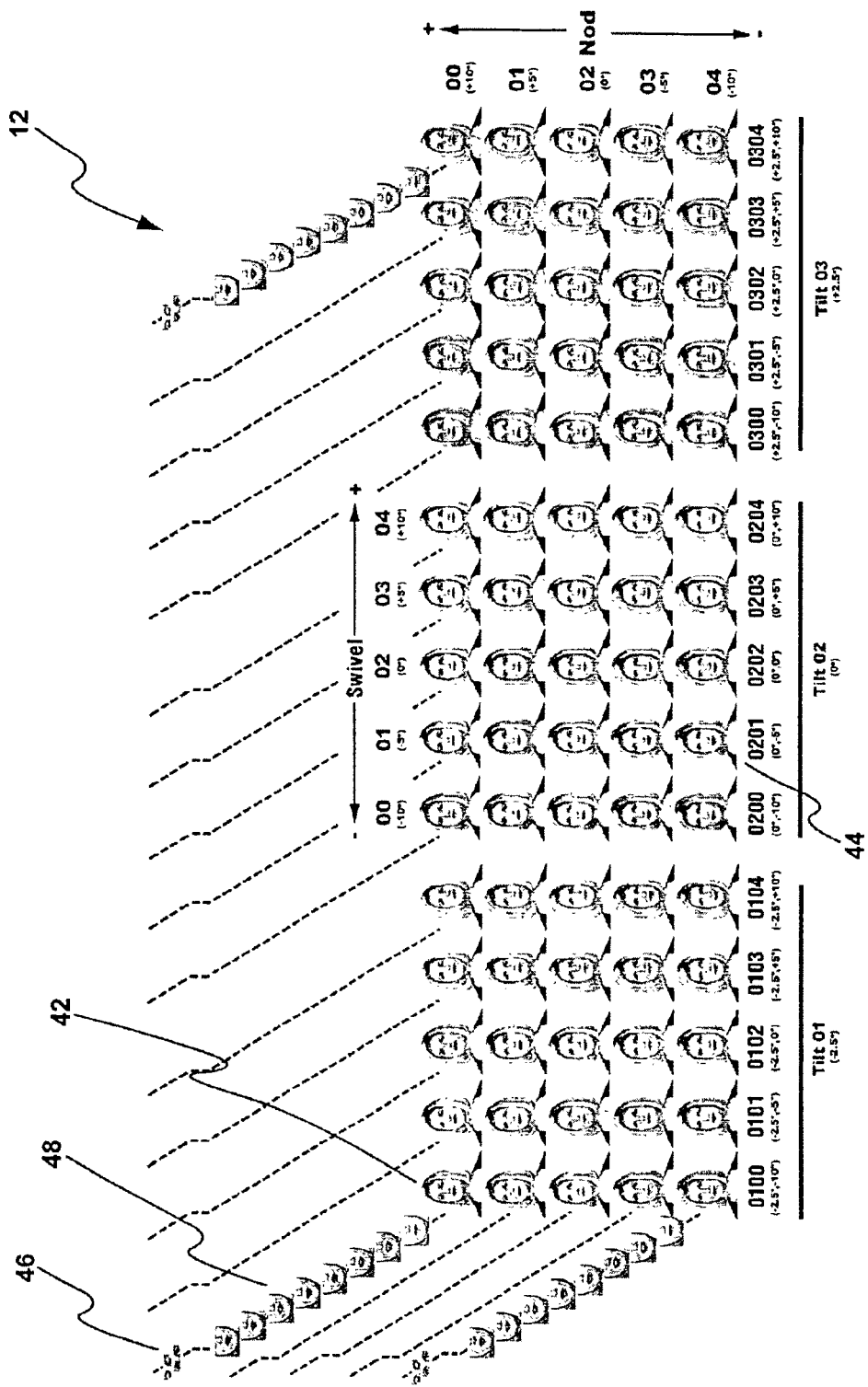
FIG. 2 is a diagrammatic representation of a photo realistic talking head library of the present invention.
Figure 3:
FIG. 3 is a view of a guide, which is used as an alignment template.
Figure 4:
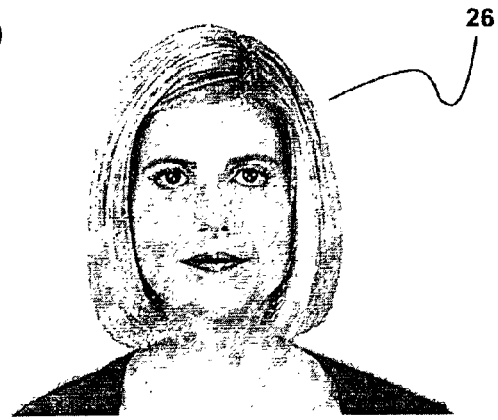
FIG. 4 is a view of a subject to be incorporated thereinto the photo realistic talking head library of FIG. 2.
Figure 7:
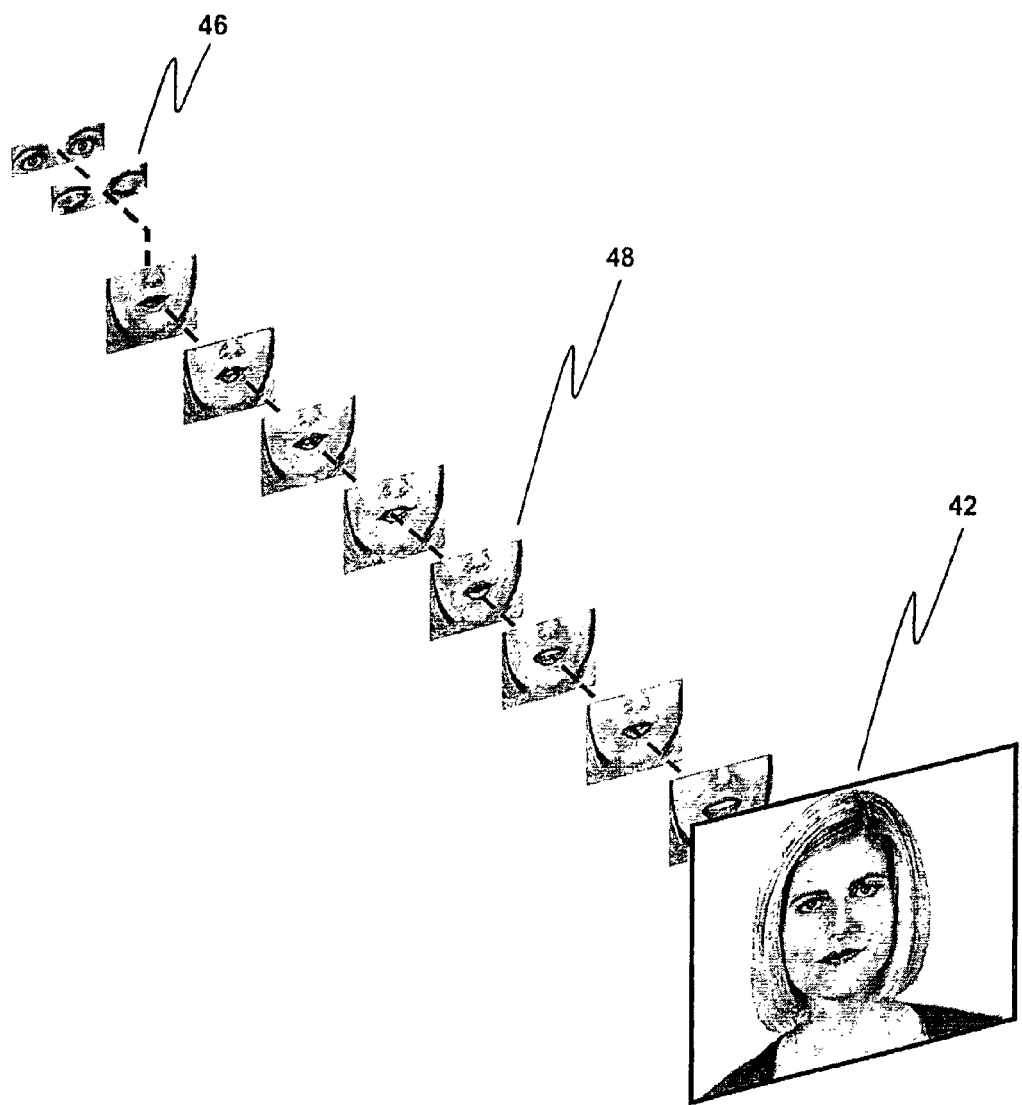
FIG. 7 shows an enlarged one of a selected image of the photo realistic talking head library of FIG. 2 at a particular angular position, and ones of different eye characteristics, and ones of different mouth characteristics at the particular angular position of the selected image, each also of the photo realistic talking head library of FIG. 2.
Figure 8:
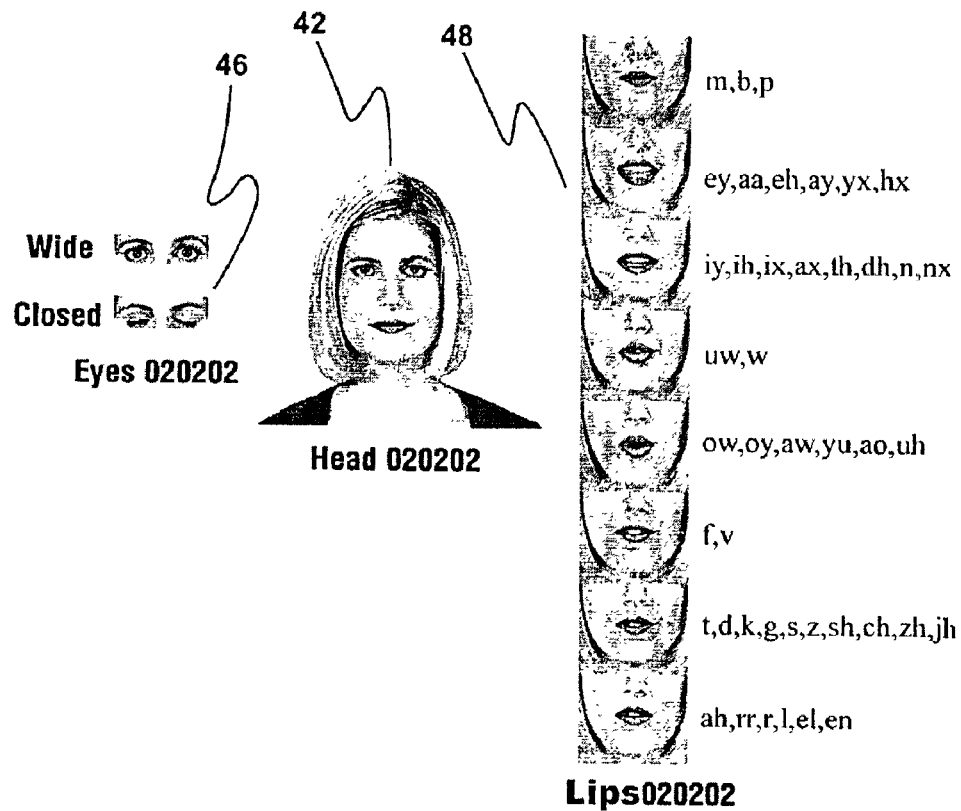
Figure 9:
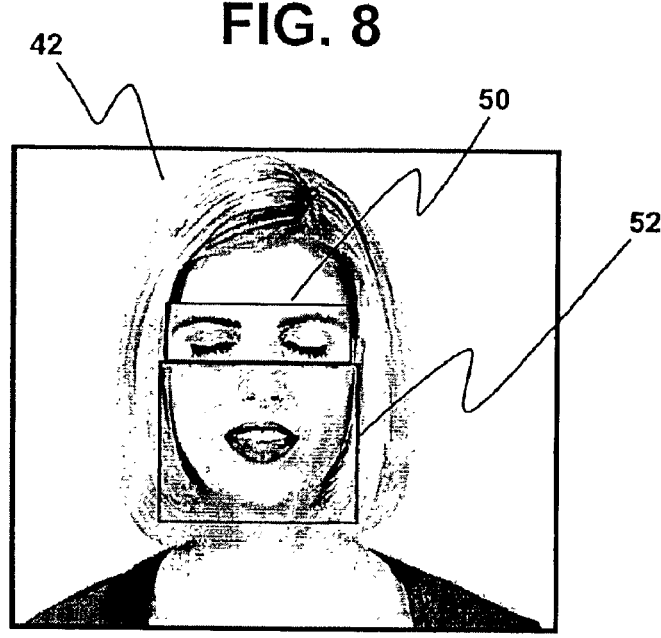
Figure 10:
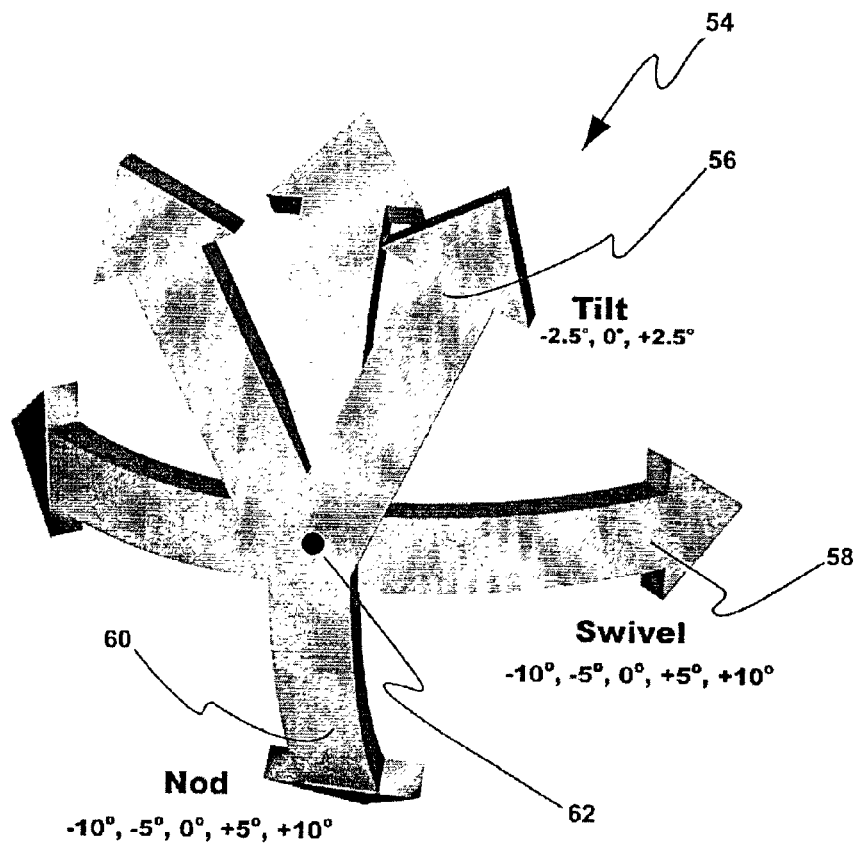
Figure 11:
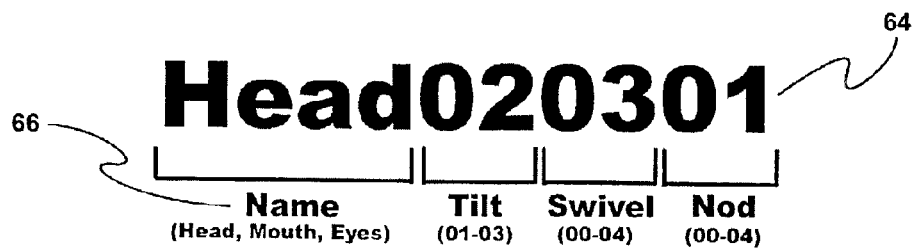
Figure 12:
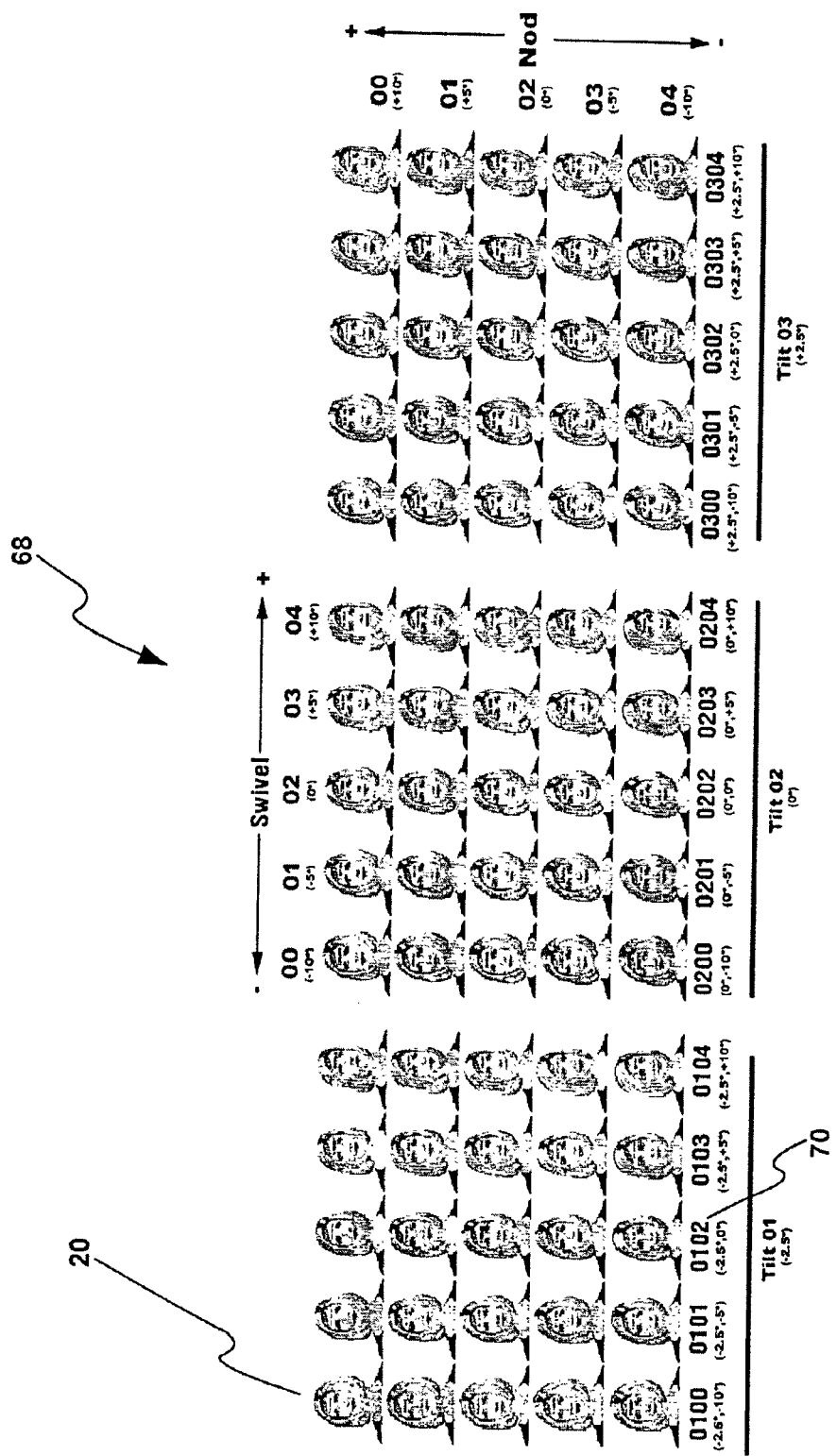
Figures 13A, 13B:
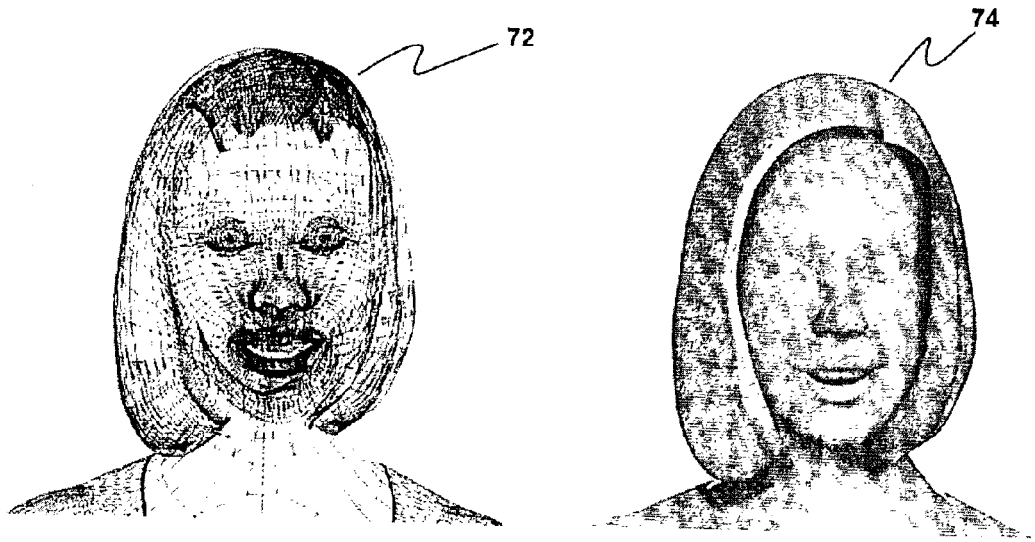
Figure 13C:
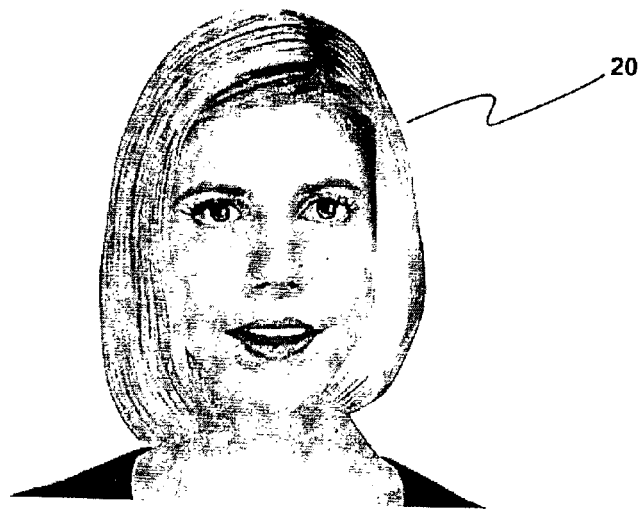
Figure 14:
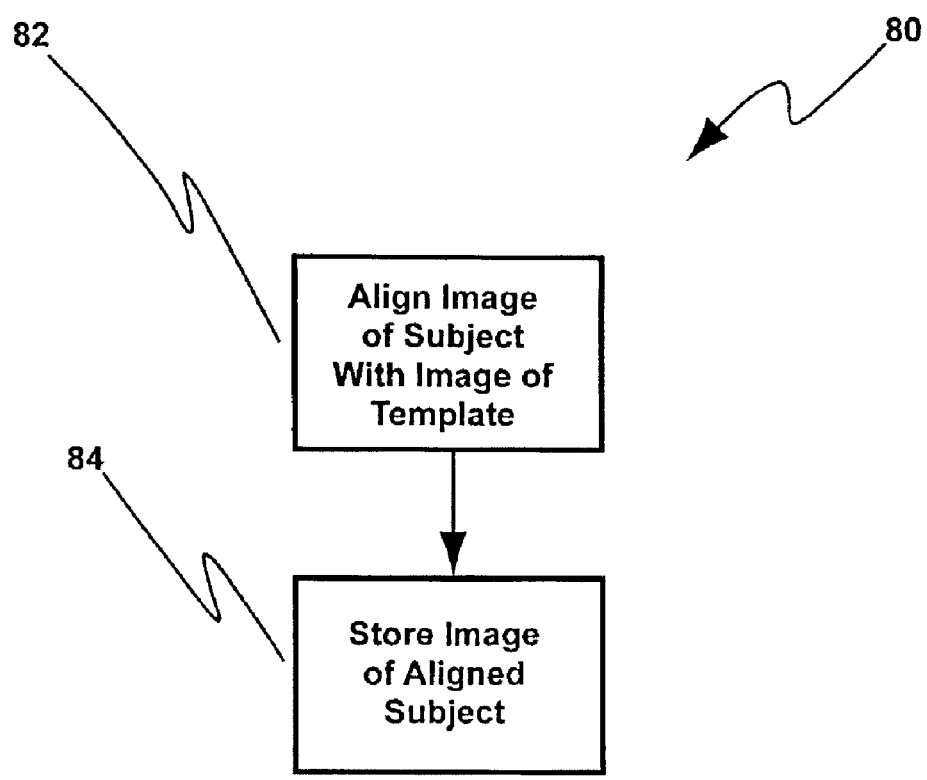
Figure 15:
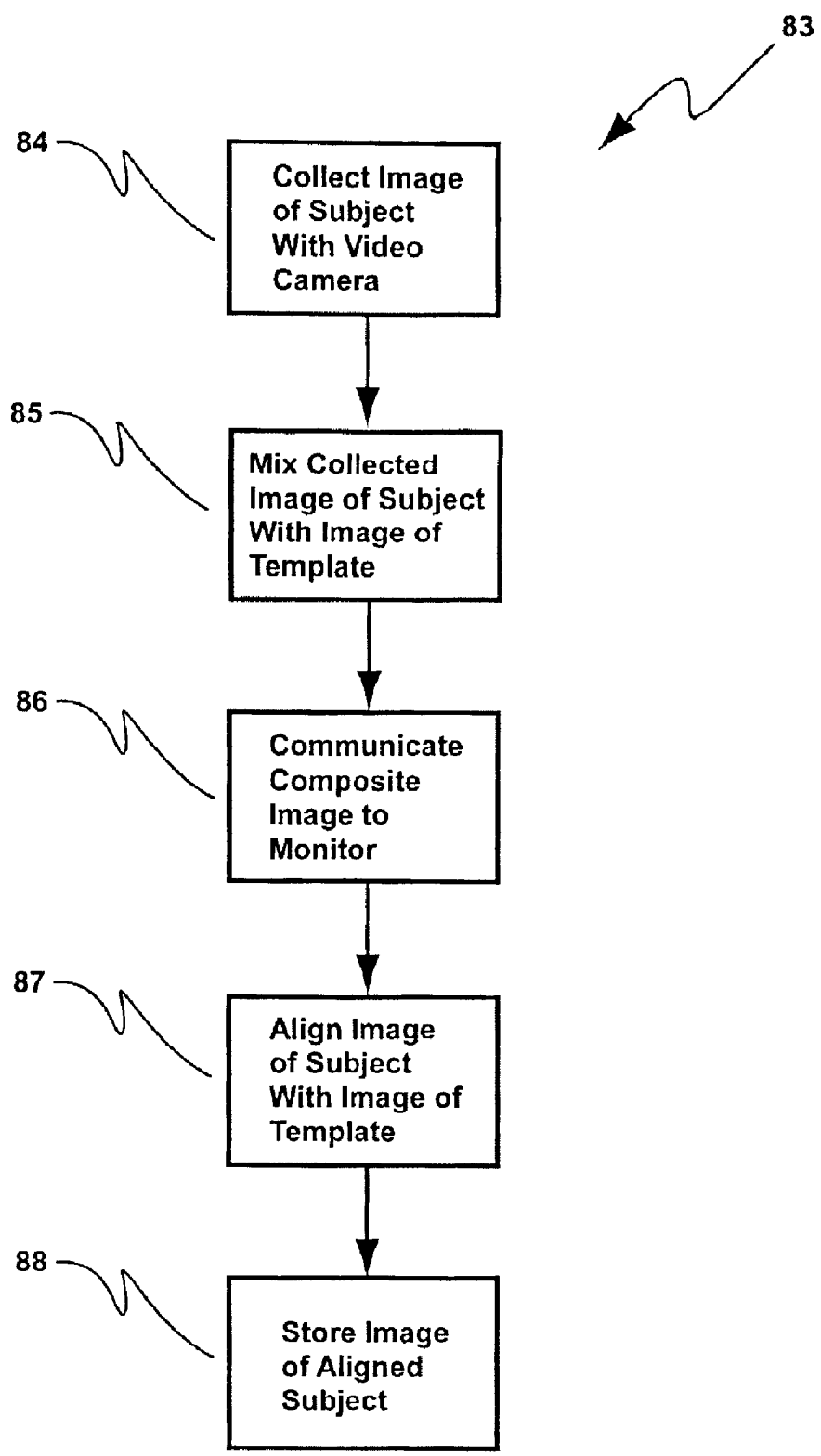
Figure 16:
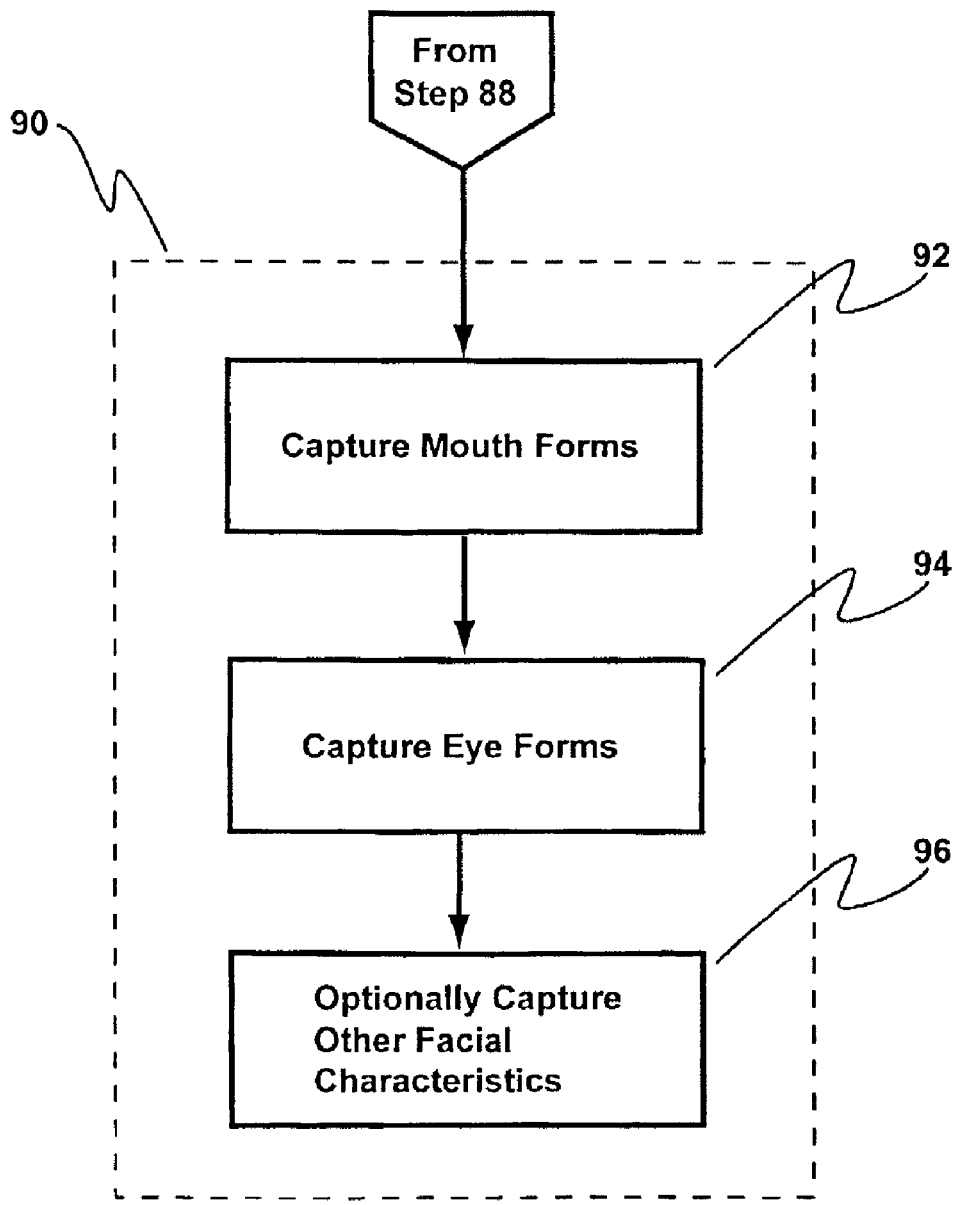
Figure 17:
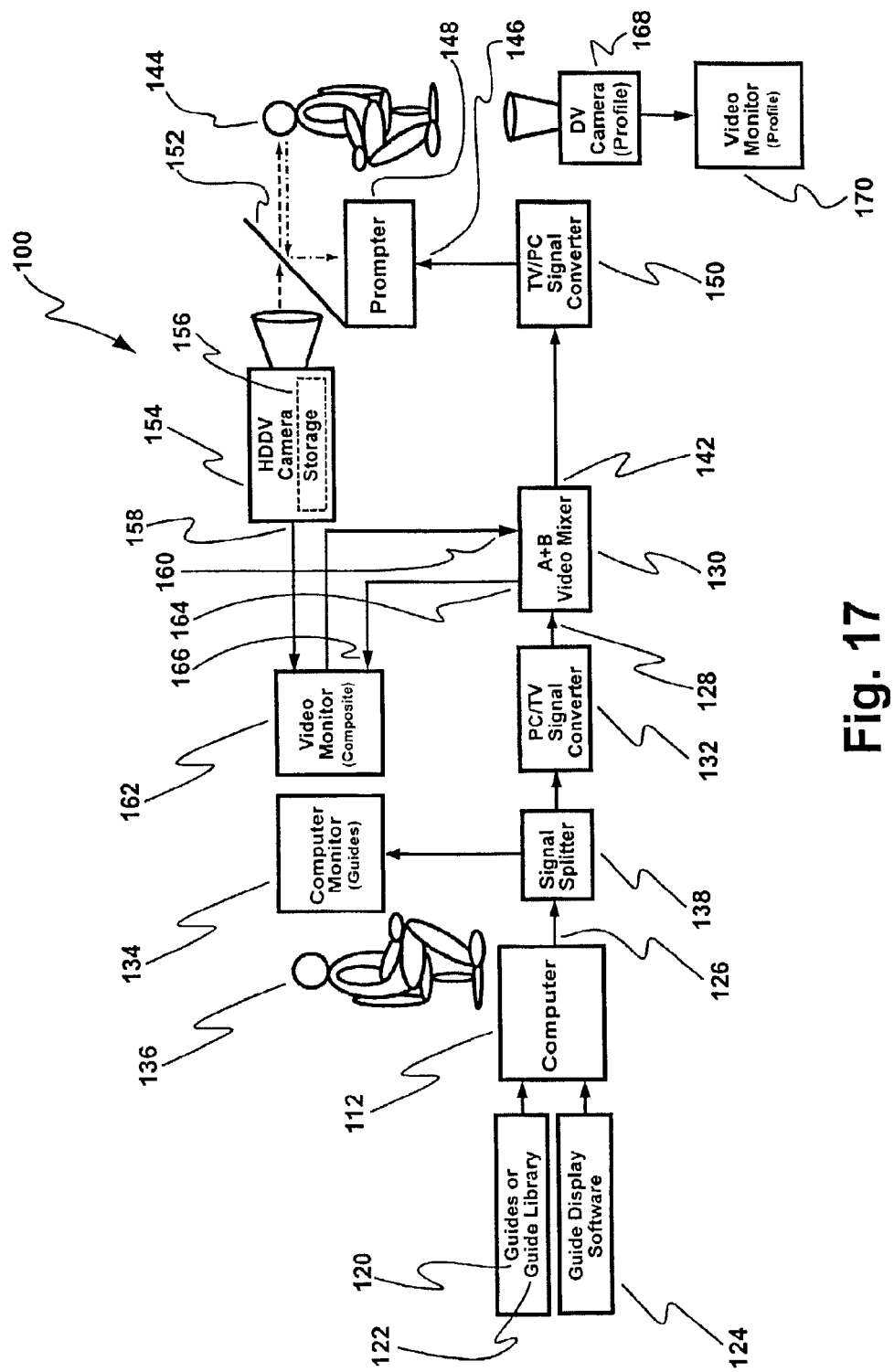
Figure 18:
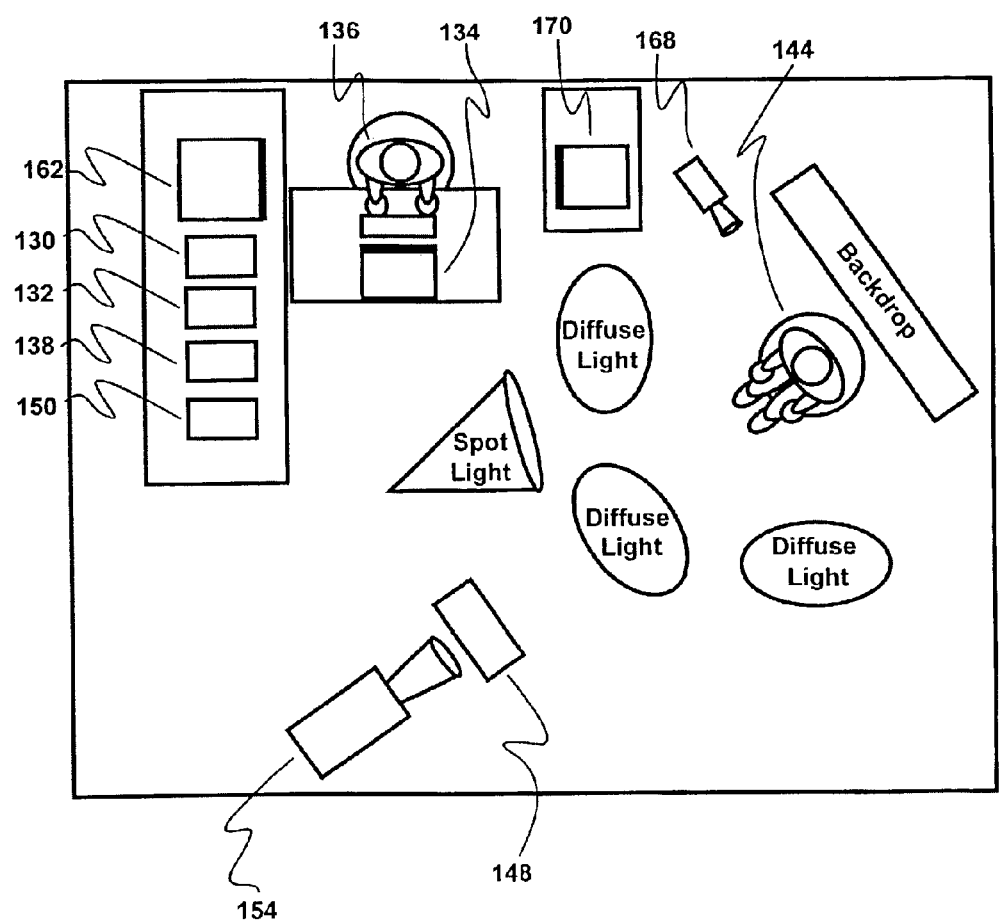
Figure 19:
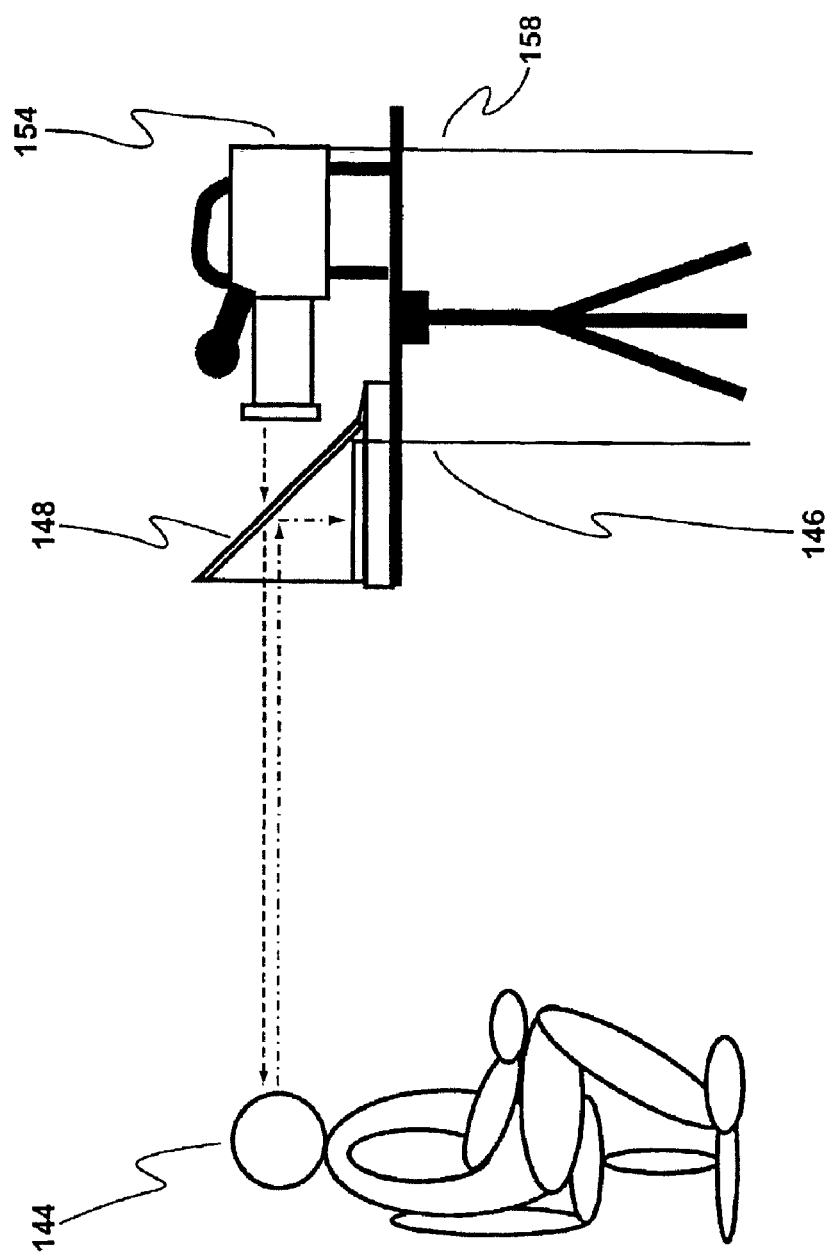

FIG. 8 shows a typical one of the selected images of the photo realistic talking head library of FIG. 2 at the particular angular position of FIG. 7, and typical ones of the different eye characteristics obtained by the subject having eyes closed and eyes wide open at the particular angular position of FIG. 7, and typical ones of the different mouth characteristics at the particular angular position of FIG. 7, obtained by the subject mouthing selected sounds;

FIG. 9 shows typical eye region and typical mouth region of the subject for obtaining the ones of the different eye characteristics and the typical ones of the different mouth characteristics of FIG. 8;

FIG. 10 shows a coordinate system having tilt, swivel, and nod vectors;

FIG. 11 shows an optional naming convention, that may be used for optional labels;

FIG. 12 is a diagrammatic representation of a guide library;

FIG. 13A is a view of a wire mesh model of the guide;

FIG. 13B is a view of the wire mesh model of the guide of FIG. 13A having phong shading;

FIG. 13C is a view of the guide of FIG. 13B having phong shading, photo mapped with a picture of a desired talking head or preferred newscaster;

FIG. 14 is a schematic representation of a method of constructing a photo realistic talking head of the present invention;

FIG. 15 is a schematic representation of an alternate method of constructing a photo realistic talking head of the present invention;

FIG. 16 is a schematic representation of additional optional steps of the method of constructing the photo realistic talking head of FIG. 15;

FIG. 17 is a block diagram of an alternate embodiment of a photo realistic talking head creation system, constructed in accordance with the present invention;

FIG. 18 is a plan view of a studio of the photo realistic talking head creation system of FIG. 17; and FIG. 19 is a side elevation view of a portion of the studio of the photo realistic talking head creation system of FIG. 18.

DESCRIPTION

The preferred embodiments of the present invention will be described with reference to FIGS. 1–19 of the drawings.

Identical elements in the various figures are identified with the same reference numbers.

Figure 1:
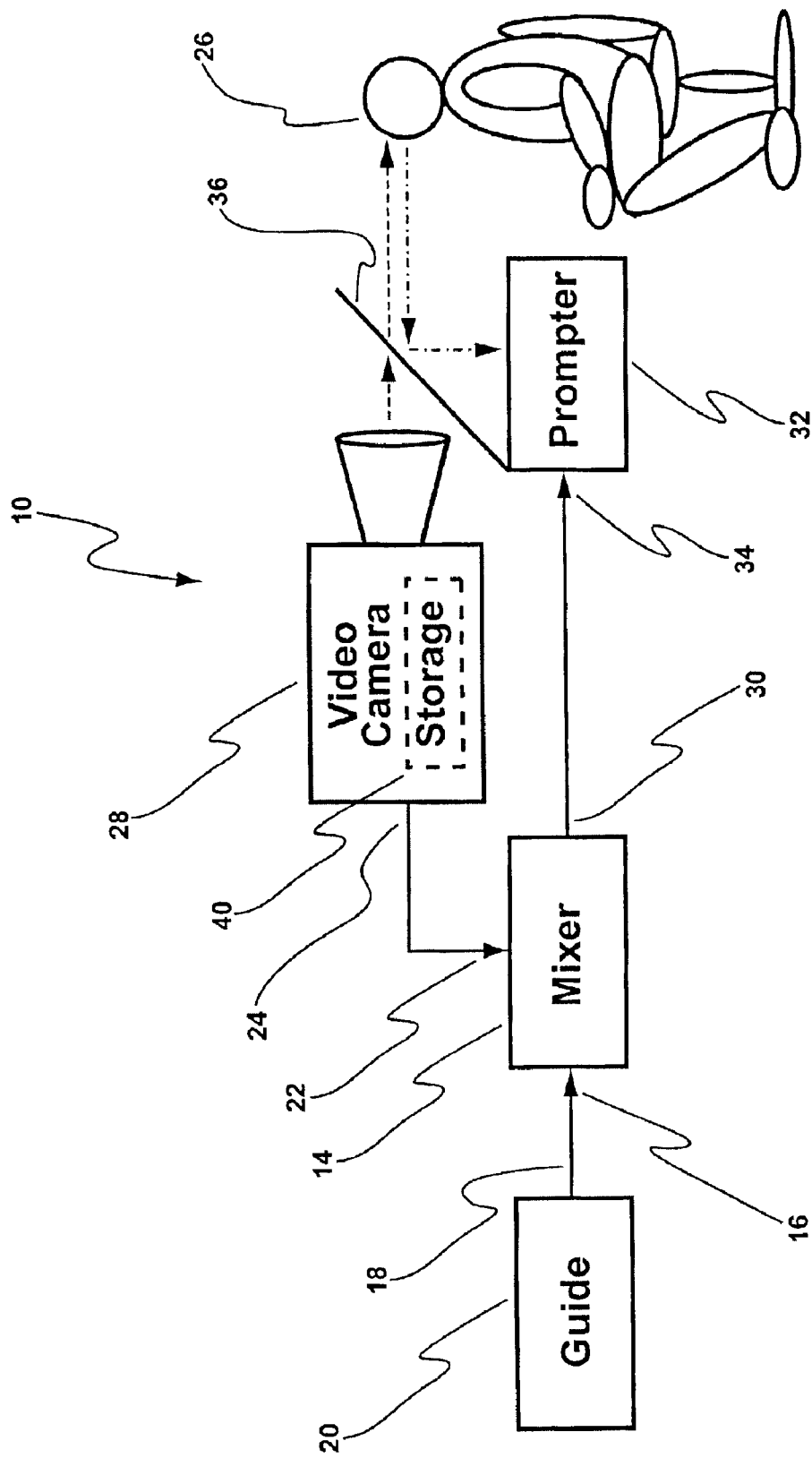
FIG. 1 is a block diagram of a photo realistic talking head creation system, constructed in accordance with the present invention.

FIG. 1 shows an embodiment of the present invention, a photo realistic talking head creation system 10, which is used to construct a photo realistic talking head library 12, shown in FIG. 2. The photo realistic talking head creation system 10 has mixer 14, which has input 16 for receiving guide image signal 18 of guide 20, shown in FIG. 3, input 22 for receiving image signal output 24 of subject 26, shown in FIG. 4, from video camera 28, and mixed signal output 30, which is a composite of the guide image signal 18 and the image signal output 24 of the subject 26. The mixer 14, thus, creates a composite image of the subject 26 and the guide 20. The photo realistic talking head creation system 10 has prompter 32, which has input 34 for receiving the mixed signal output 30 therefrom the mixer 14, and partially reflecting mirror 36, for displaying composite output image 38, shown in FIG. 5, which is a composite image of the subject 26 aligned with the guide 20. The video camera 28 has storage 40 therein for storing ones of selected images 42, shown in FIG. 2, viewed therewith the video camera 28, for construction thereof the photo realistic talking head library 12, shown in FIG. 2. The storage 40 may, however, be alternatively external thereto and/or supplemented with storage external thereto the video camera 28. The partially reflecting mirror 36 of the prompter 32 is adapted to accommodate displaying the composite output image 38, shown in FIG. 5, thereto the subject 26, and the video camera 28 viewing the subject 28 therethrough.

Figure 5:
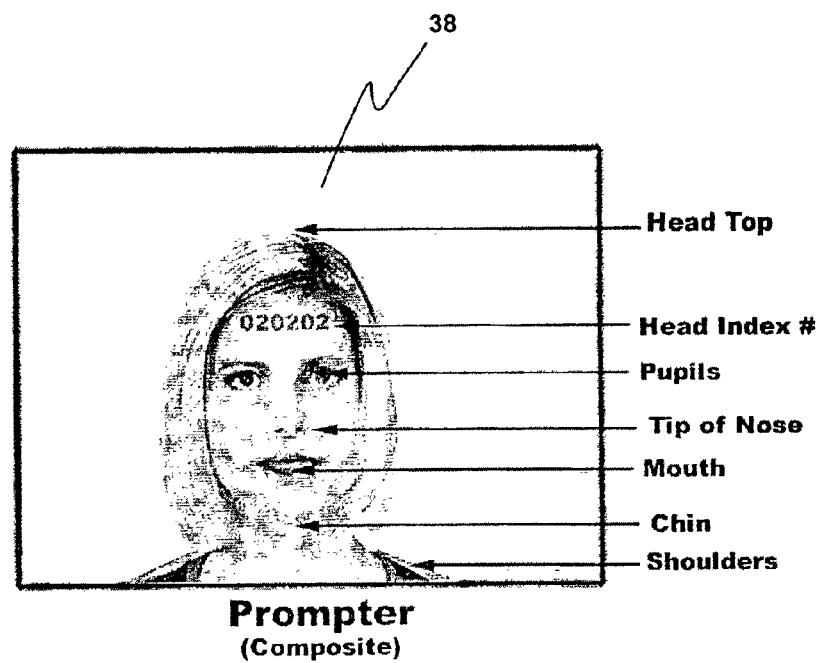
FIG. 5 is a composite view of the subject of FIG. 4 aligned with the guide of FIG. 3.
Figure 6:
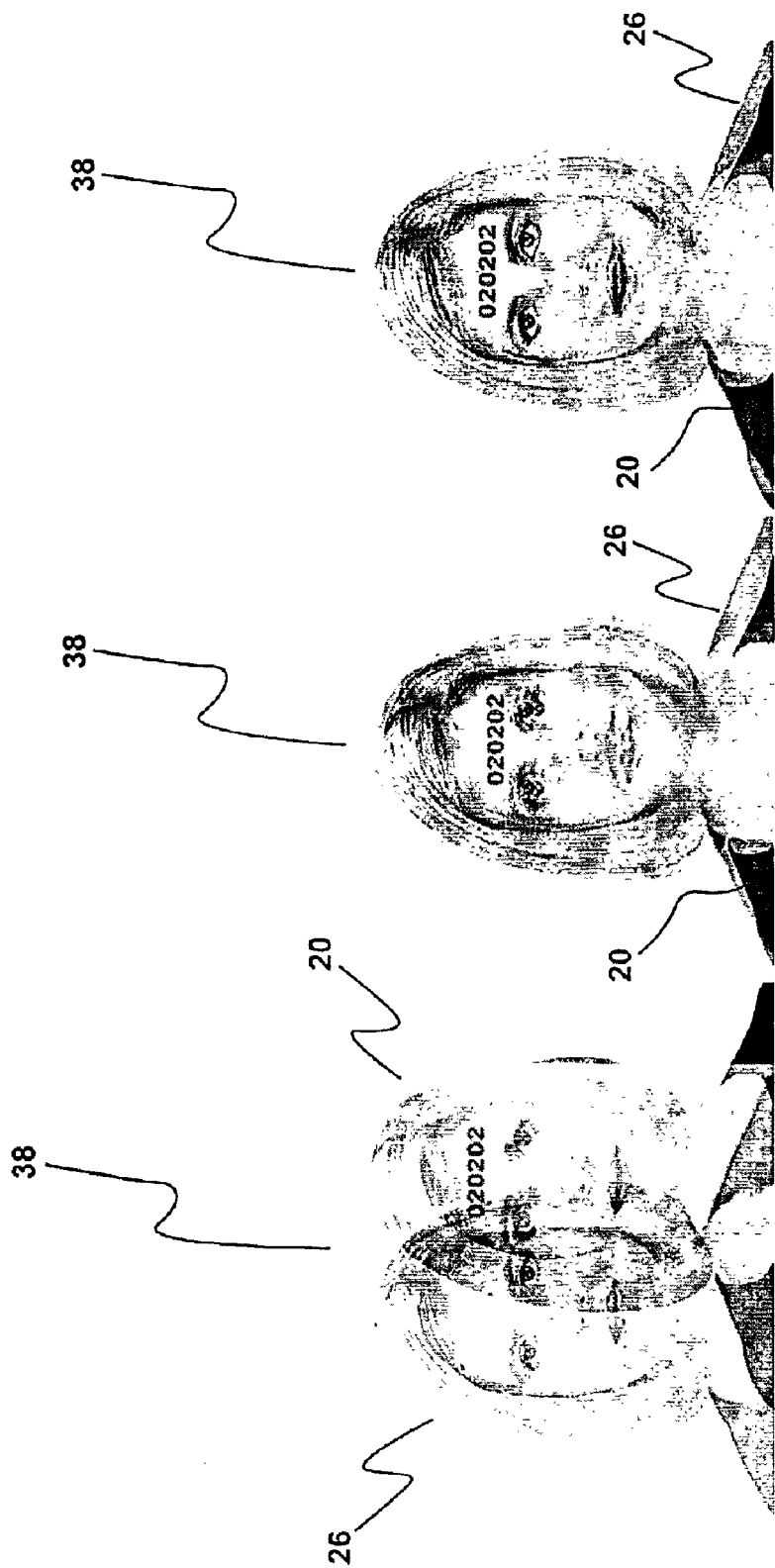
FIG. 6A is a composite view of the subject of FIG. 4 horizontally displaced from the guide of FIG. 3.
FIG. 6B is a composite view of the subject of FIG. 4 vertically displaced from the guide of FIG. 3.
FIG. 6C is a composite view of the subject of FIG. 4 and the guide of FIG. 3 in close proximity to being aligned.

The guide 20 is used as a template for aligning the subject 26 therewith in the composite output image 38. Upon alignment of the subject 26 with the guide 20, the image 42 is stored therein the storage 40. FIGS. 6A–6C show the composite output image 38 at different stages of alignment of the subject 26 with the guide 20. FIG. 6A shows the subject 26 horizontally displaced from the guide 20; FIG. 6B shows the subject 26 vertically displaced from the guide 20; and FIG. 6C shows the subject 26 and the guide 20 in closer alignment. FIG. 5 shows the subject 26 aligned with the guide 20.

The photo realistic talking head library 12 is constructed of ones of the selected images 42 at different angular positions 44 and different eye characteristics 46 and different mouth characteristics 48 at each of the angular positions 44, shown in FIG. 2, in accordance with coordinate system and optional naming convention of FIGS. 10 and 11, respectively. FIG. 7 shows an enlarged one of the selected images 42 at a particular angular position of FIG. 2, and ones of the different eye characteristics 46 and ones of the different mouth characteristics 48 at the particular angular position of the selected image 42. FIG. 8 shows a typical one of the selected images 42 at the particular angular position of FIG. 7, and typical ones of the different eye characteristics 46 obtained by the subject 26 having eyes closed and eyes wide open at the particular angular position of FIG. 7, and typical ones of the different mouth characteristics 48 at the particular angular position of FIG. 7, obtained by the subject 26 mouthing selected sounds. Once the subject 26 aligns his or herself with the guide 20 at the particular angular positions, the subject 26 performs closes and opens the eyes, and speaks a set of prose, which includes selected phonemes. The subject 26 may also, optionally, perform additional facial gestures such as smiling and/or frowning. FIG. 9 shows typical eye region 50 and typical mouth region 52 of the subject 26 for obtaining the ones of the different eye characteristics 46 obtained by the subject 26 having eyes closed and eyes wide open at the particular angular position of FIG. 7, and typical ones of the different mouth characteristics 48 at the particular angular position of FIG. 7, respectively.

FIG. 10 shows coordinate system 54 having tilt 56, swivel 58, and nod 60 vectors for the different angular positions 44 of the subject 26, the guide 20, the selected images 42, and the different eye characteristics 46 and the different mouth characteristics 48 associated therewith the selected images 42 of the photo realistic talking head library 12. The tilt 56, the swivel 58, and the nod 60 vectors, each designate direction and angular position therefrom neutral 62, typical angles and directions of which are shown in FIG. 10, although other suitable angles and directions may be used. The swivel 58 vector uses azimuthal angular position (side to side) as the angular component thereof, and the nod 60 vector uses elevational angular position (up or down) as the angular component thereof. The tilt 56 vector is upwardly left or right directed angularly either side of the nod 60 vector.

FIG. 11 shows optional naming convention 64 associated therewith the tilt 56, the swivel 58, and the nod 60 vectors for the subject 26, the guide 20, the selected images 42, and the different eye characteristics 46 and the different mouth characteristics 48 associated therewith the selected images 42 of the photo realistic talking head library 12. Other suitable optional naming conventions may be used or actual vector directions and angles. The optional naming convention 64 uses a consecutive numbering scheme having the tilt 56 vectors monotonically increasing upward from 01 for each of the designated directions and angles from a minus direction to a plus direction; thus, for the typical angles of −2.5°, 0°, and +2.5° for the tilt 56, the optional naming convention 64 uses 01, 02, and 03 to designate the typical angles of −2.5°, 0°, and +2.5°, respectively. The optional naming convention 64 uses a consecutive numbering scheme having the swivel 58 and the nod 60 vectors monotonically increasing upward from 00 for each of the designated directions and angles from a minus direction to a plus direction; thus, for the typical angles of −10°, −5°, 0°, +5°, and +10° for the swivel 58 and the nod 60, the optional naming convention 64 uses 00, 01, 02, and 03 to designate the typical angles of −10°, −5°, 0°, +5°, and +10°, respectively. Suitable angles other than the typical angles of −2.5°, 0°, and +2.5° for the tilt 56, and/or suitable angles other than the typical angles of −10°, −5°, 0°, +5°, and +10° for the swivel 58 and the nod 60 may be used; however, the monotonically increasing consecutive numbering scheme may still be used, starting at 01 for the tilt 56, and 00 for the swivel 58 and the nod 60 for other directions and angles from negative through zero degrees to positive angles. Name 66 uses head, mouth, and eyes as optional labels or designators, head for the selected image 42, the subject 26, or the guide 20, eye for the eye characteristic 46, and mouth for the mouth characteristic 48. Head020301, thus, represents, for example, the selected image 42 having the tilt 56, the swivel 58, and the nod 60 as 0°, +5°, −5°, respectively, for the typical angles shown in FIG. 10.

FIG. 12 shows a guide library 68 having ones of the guides 20 at different angular positions 70, shown in accordance with the coordinate system 54 of FIG. 10 and the optional naming convention 64 of FIG. 11. Each of the guides 20 of FIG. 11 is used to construct corresponding ones of the selected images 42 at corresponding ones of the angular positions 44 and the different eye characteristics 46 and the different mouth characteristics 48 at the corresponding ones of the angular positions 44 corresponding to the angular positions 70 of each of the guides 20 thereof the guide library 68. The subject 26, thus, aligns himself or herself with the guide 20 in the composite output image 38 each at a different one of the angular positions 70 to construct each of the selected images 42, opens and closes his or her eyes to construct each of the ones of the different eye characteristics 46 at the particular angular position of each of the aligned selected images 42, and repetitively mouths each of the ones of the different mouth characteristics 48 at the particular angular position of each of the aligned selected images 42 corresponding to each of the angular positions 70, and, thus, constructs the photo realistic talking head library 12 of FIG. 2.

FIGS. 13A–C show a diagrammatic representation of typical stages in the development one of the guides 20. It should be noted, however, that other suitable techniques may be used to develop ones of the guides 20. Each of the guides 20 is typically a medium resolution modeled head, that resembles a desired talking head or preferred newscaster in a different angular position, a typical one of the guides 20 being shown in FIG. 13C, each of the guides 20 being used as a template for aligning the subject 26 thereto at a selected one of the different angular positions. Each of the guides 20 may be constructed, using a suitable technique, such as laser scanning, artistic modeling, or other suitable technique, which typically results in the guides 20 each being a 3D modeled head having approximately 5000 polygons. Modeling software, such as 3D modeling software or other suitable software, may be used to create the guides 20. Typical commercial 3D modeling software packages that are available to create the guides 20 are: 3D STUDIO MAX, LIGHTWAVE, MAYA, and SOFTIMAGE, although other suitable modeling software may be used. First, an underlying wire mesh model 72 is created, as shown in FIG. 13A. Phong shading is typically added to the wire mesh model 72 to create a shaded model 74, as shown in FIG. 13B, which has a solid appearance. The shaded model 74 having the solid appearance is then typically photo mapped with a picture of the desired talking head or preferred newscaster, to create the guide 20 of FIG. 13C, which resembles the desired talking head or preferred newscaster. The guide 20 is rendered in specific head poses, with an array of right and left, up and down, and side-to-side rotations that correspond to desired guide library poses of the selected images 42 of the photo realistic talking head library 12, which results in the guide library 68 having ones of the guides 20 at different angular positions, each of which are used as alignment templates at the different angular positions. Each of the guides 20 are typically stored as bitmapped images, typically having 512×384 pixels or less, typically having a transparent background color, and typically indexed with visible indicia typically in accordance with the coordinate system 54 of FIG. 10 and the optional naming convention 64 of FIG. 11, although other suitable indicia and storage may be used.

The prompter 32 may be any suitable prompter having a partially reflecting mirror 36 or other suitable prompter. Prompters are quite common in the television industry and the audio visual industry. An early version of a typical prompter is disclosed in U.S. Pat. No. 2,711,667 (Simjian), which describes a prompting device for a person posing in front of a moving picture camera, a television camera, or similar apparatus, in which visual prompting information is made available to the person posing, but rendered invisible to such audio-visual recording apparatus, although later prompters are suitable, which have a variety of additional options and/or capabilities.

The mixer 14 may be any suitable video mixer. Video mixers are quite common in the television industry and the audio visual industry, and have a variety of options and capabilities. Typical video mixers mix or combine a plurality of video input signals, and create a composite output signal of the video input signals. Such video mixers typically have controls for adjusting the proportion of superposition of the video input signals, and, thus, the proportion of superposition of the subject 26 and the guide 20 one with the other therein the composite output image 38, and for flipping either or both images, for example, horizontally so as to mirror the image of either or both, as well as other options. Typical video mixers that may be used are Videonics MX-1, MXPro, MXProDV, although other suitable video mixers of other manufacturers may be used.

Since the image of the subject 26 is mirrored in the partially reflecting mirror 36 of prompter 32, it may be necessary to mirror the image of the guide 20, depending upon the construction of the guide 20, which may be constructed as not mirrored or mirrored. If the image of the guide 20 is not mirrored, then, the mixer 14 may be used to horizontally flip the image of the guide 20, as required, so as to display the image of the subject 26 and the guide 20 directionally coincident one with the other, although other suitable methods may be used. The subject 26, thus, sees a superposition of his or her image and the image of the guide 20, and aligns his or her image with the image of the guide 20, as shown at different stages of alignment in FIGS. 5, 6A, 6B, and 6C.

The video camera 28 is preferably a high definition digital video camera, which can produce digital video frame stills comparable in quality and resolution to a digital still camera, although other suitable cameras and/or electronic image collection apparatus may be used.

The storage 40 is preferably digital videotape or real time digital video feed played into a lossless digital video editing system, although other suitable storage may be used.

FIG. 14 shows steps of a method of constructing a photo realistic talking head 80, which comprises at least the following steps: aligning an image of a subject with an image of a guide or template 82; storing the image of the aligned subject 84, the stored image representing a frame of a talking head.

The method of constructing a photo realistic talking head 80 may have additional steps, as shown FIG. 15, which shows a method of constructing a photo realistic talking head 83, which is substantially the same as the method of constructing a photo realistic talking head 80, except that the method of constructing a photo realistic talking head 83, comprises at least the following steps: collecting the image of a subject with a video camera or other device 84; mixing the collected image of the subject with the image of a guide or template, thus, creating a composite image thereof the subject and the guide or template 85; and communicating the composite image thereto a prompter for display to the subject, the prompter adapted to facilitate the subject aligning the image of the subject with the image of the guide or template 86; aligning the image of the subject with the image of the guide or template 87; storing the image of the aligned subject 88. The method of constructing a photo realistic talking head 83 typically has the prompter having a partially reflecting mirror therebetween the video camera and the subject, the partially reflecting mirror adapted to display the composite image thereto the subject and to facilitate the video camera to collect the image of the subject.

The method of constructing a photo realistic talking head 83 may have additional optional steps, as shown in FIG. 16, comprising: capturing facial characteristics 90; including capturing mouth forms 92; capturing eye forms 94; optionally capturing other facial characteristics 96.

FIG. 17 shows a photo realistic talking head creation system 100, which is substantially the same as the photo realistic talking head creation system 10, except that the photo realistic talking head creation system 100 has personal computer 112, which may be used to store guides 120 individually and/or as guide library 122, and to control output of the guides 120 therefrom. The photo realistic talking head creation system 100 may also have optional guide control software 124, which provides optional control of position and size of the guides 120, easy access to and selection thereof the guides 120 and/or the guide library 122. The guides 120 and the guide library 122 may be loaded into the personal computer 112 and/or stored therein. The optional control software 124, which is a computer program, may be loaded into the personal computer 112 and/or stored therein.

Signal output 126 of the personal computer 112 may be fed directly thereto input 128 of mixer 130, or therethrough PC/TV signal converter 132, depending upon signal input requirements of the mixer 130, output signal characteristics of the personal computer 112, and/or compatibility of one with the other. The PC/TV signal converter 132 is shown for thoroughness, although certain ones of the personal computer 130 may have the PC/TV converter 132 as an integral part thereof and/or built in, while certain ones of the mixer 130 may already be compatible with the personal computer 112, in which case the PC/TV converter 132 is not required. The PC/TV signal converter 132 may be used to convert computer compatible signals, such as SVGA or other suitable computer compatible signals, thereto television signals, such as NTSC, PAL, SECAM, discrete digital, or other suitable television signals, or suitable video signals for use therein the mixer 130. The PC/TV signal converter 132 is optional, being required in instances in which the mixer 130 and the personal computer 130 have different signal compatibility requirements, such as in situations where the mixer 130 requires a different type of signal than is available therefrom the personal computer 130.

Optional monitor 134 may be used by operator 136, shown in FIG. 17, to view and/or aid in control of the guides 120 and/or the guide library 122. The optional computer monitor 134 allows the operator 136 flexibility in managing the guides 120 and/or the guide library 122. The guides 120 and/or the guide library 122 may be optionally viewed on the optional monitor 134 for quality and optional image adjustment and/or control therewith guide control software 124. The optional monitor 134 may be fed directly therefrom the personal computer 112, or optional signal splitter 138 may be used to split the signal output 126 therefrom the personal computer 112 to feed the mixer 130 directly, or therethrough the PC/TV converter 132 if required, and the optional monitor 134.

Output 142 of the mixer 130 has a signal, which is a composite of the guide 120 and subject 144. The output 142 of the mixer 130 may be fed directly thereto input 146 of the prompter 148 or therethrough TV/PC signal converter 150, depending upon signal input requirements of prompter 148, output signal characteristics of the mixer 130, and/or compatibility of one with the other. The TV/PC signal converter 150 is shown for thoroughness, although certain ones of the mixer 130 may have the TV/PC signal conversion capability as an integral part thereof and/or built in, while certain ones of the prompter 148 may already be compatible with the mixer 130, in which case the TV/PC signal converter 150 is not required. The TV/PC signal converter 150 may be used to convert television and/or video compatible signals, such as NTSC, PAL, SECAM, discrete digital, or other suitable television signals, or suitable video signals, thereto suitable computer compatible signals, such as SVGA or other computer compatible signals that may be required for use therein the mixer 130. The TV/PC signal converter 150 is optional, being required in instances in which the mixer 130 and the prompter 148 have different signal compatibility requirements, such as in situations in which the prompter 148 requires a different type of signal than is available therefrom the mixer 130.

The subject 144 aligns his or herself with the guide 120, using partially reflecting mirror 152 of the prompter 148, which has a composite image of the subject 144 and the guide 120, the output 142 of the mixer 130 fed thereto the prompter 148 having a signal, which is a composite of the guide 120 and subject 144.

Video camera 154 has storage 156 therein for storing images of the subject 144. The storage 156 may, however, be alternatively external thereto and/or supplemented with storage external thereto the video camera 154. The storage 156 is preferably digital videotape or real time digital video feed played into a lossless digital video editing system, although other suitable storage may be used.

Output 158 of the video camera 154 may be fed directly to input 160 of the mixer 130 or optionally therethrough optional video monitor 162 thereto the input 160 of the mixer 130, which provides video signal to both the mixer 130 and the optional video monitor 162, and allows the operator 136 to optionally view the output 158 of the video camera 154. The video camera 154 is preferably a high definition digital video camera, which can produce digital video frame stills comparable in quality and resolution to a digital still camera, although other suitable cameras and/or electronic image collection apparatus may be used.

Output 164 of the mixer 130 also has a signal, which is a composite of the guide 120 and the subject 144, which may optionally be fed to input 166 of the optional video monitor 162. The composite image of the guide 120 and the subject 144 may be viewed by the operator 136 therewith the optional computer monitor 134, and may be optionally used by the operator 136 to view and/or aid in control of the guides 120 and/or the guide library 122, and to optionally aid the operator 136 in prompting the subject 144 in aligning his or herself with the guide 120. The operator 136 may, thus, optionally, assist the subject 144 in aligning his or her image with the image of the guide 120, and by monitoring the accuracy of alignment of key facial features, such as the top of the head, pupils of the eyes, tip of the nose, corners of the mouth, chin, and shoulders.

The optional computer monitor 134 allows the operator 136 flexibility in managing the guides 120 and/or the guide library 122. The guides 120 and/or the guide library 122 may be optionally viewed on the optional monitor t34 for quality and optional image adjustment and/or control therewith guide control software 124. The optional monitor 134 may be fed directly therefrom the personal computer 112, or optional signal splitter 138 may be used to split signal output 140 therefrom the personal computer 112 to feed the mixer 130 directly, or therethrough the PC/TV converter 132 if required, and the optional monitor 134. The composite image of the guide 120 and the subject 144 fed therefrom the output 164 of the mixer 130 thereto the optional video monitor 162 and the output 158 of the video camera 154 having the image of the subject 144 fed thereto the optional video monitor 162 may be switched and/or the intensity of the images controlled by optional switches and/or optional potentiometer/amplifier controls thereof the optional video monitor 162, respectively.

The photo realistic talking head creation system 100 may also have optional profile camera 168 and optional video monitor 170, which may be used to monitor profile posture of the subject 144, optionally index proper positioning of the subject 144, and ensure that the axis of head rotation of the subject 144 does not drift off its intended target, during the capture sessions.

An animation artist may optionally play the session, and select specific frames, i.e., freeze frames to be source images of a final photo realistic talking head library. The animation editor may frequently synchronize selected frames with corresponding ones of the guides 120 to assess the accuracy of the captured frame, thus, creating the final photo realistic talking head library of actual photographs, which substantially match position and motion patterns of the guides 120.

FIG. 18 shows a plan view of a studio of the photo realistic talking head creation system 100, and FIG. 19 is a side elevation view of a portion of the studio of the photo realistic talking head creation system 100.

Although the present invention has been described in considerable detail with reference to certain preferred versions thereof, other versions are possible. Therefore, the spirit and scope of the appended claims should not be limited to the description of the preferred versions contained herein.

What is claimed is:

1. A device for constructing a photo realistic human talking head, comprising:

a library of alignment templates,
   each said alignment template being different one from the other and representational of an alignment template frame of a photo realistic human talking head having an alignment template head angular position, comprising a template head tilt, a template head nod, and a template head swivel component,
   each said alignment template frame different one from the other, each said alignment template head angular position different one from the other;

a controller,
   said controller selecting a said alignment template from said library of alignment templates corresponding to a specified alignment template head angular position and having an image output signal representational of said alignment template;

a video camera,
   said video camera collecting an image of a human subject having a head having a human subject head angular position, comprising a human subject head tilt, a human subject head nod, and a human subject head swivel component,
   said video camera having an output signal representational of said collected image of said human subject;

a mixer,
   said mixer having an input receiving said selected alignment template image output signal and another input receiving said output signal of said video camera representational of said collected image of said human subject,
   said mixer mixing said received alignment template image output signal and said received output signal of said video camera representational of said collected image of said human subject into a composite image, and an output signal representational of said composite image;

a prompter,
- said prompter having a partially reflecting mirror,
- said partially reflecting mirror between said video camera and said human subject,
- said prompter having an input receiving said output signal of said mixer representational of said composite image,
- said partially reflecting mirror adapted to allow said video camera to collect said image of said human subject therethrough and said human subject to view said composite image and said human subject to align said image of said head of said human subject with said alignment template head at substantially the same angular position as said specified alignment template head angular position;

storage means storing a library of collected images of said human subject with said head of said subject at different human subject head angular positions,
- said storage means having an input receiving said output signal of said video camera representational of said collected image of said human subject,
- said storage means receiving and storing said video camera output signal as a stored image of said human subject, when said human subject has said head of said human subject substantially aligned with said alignment template head,
- said stored image of said human subject having said human subject head angular position substantially the same as said specified alignment template head angular position,
- each said stored image in said library of collected images being different one from the other,
- each said stored image human subject head angular position different one from the other;
- each said stored image human subject head angular position of said library of collected images corresponding to and substantially the same as and aligned with a selected said alignment template head angular position of said library of alignment templates;
- each said stored image representing a different frame of a photo realistic human talking head.

2. The device for constructing a photo realistic human talking head according to claim 1, wherein said collected image of said human subject further comprises additional collected images of at least one facial characteristic of said head of said human subject corresponding to said specified alignment template head angular position, said library of collected images further comprises different stored images of said at least one facial characteristic at each said different human subject head angular position;
- each said stored facial characteristic image representing an additional frame of said photo realistic human talking head.

3. The device for constructing a photo realistic human talking head according to claim 2, wherein said at least one facial characteristic comprises different mouth forms.

4. The device for constructing a photo realistic human talking head according to claim 2, wherein said at least one facial characteristic comprises different eye forms.

5. The device for constructing a photo realistic human talking head according to claim 3, wherein said at least one facial characteristic comprises different eye forms.

6. The device for constructing a photo realistic human talking head according to claim 1, wherein said controller comprises a computer having a control program.

7. The device for constructing a photo realistic human talking head according to claim 6, wherein said alignment template has at least one characteristic, said control program is adapted to control said at least one characteristic of said selected alignment template.

8. The device for constructing a photo realistic human talking head according to claim 6, wherein said collected image of said human subject has at least one characteristic, said control program is adapted to control said at least one characteristic of said collected image of said human subject.

9. The device for constructing a photo realistic human talking head according to claim 7, wherein said collected image of said human subject has at least one characteristic, said control program is adapted to control said at least one characteristic of said collected image of said human subject.

10. The device for constructing a photo realistic human talking head according to claim 1, wherein said device for constructing a photo realistic human talking head has a monitor having an input for receiving said selected alignment template.

11. The device for constructing a photo realistic human talking head according to claim 10, wherein said device for constructing a photo realistic human talking head has a computer having said library of alignment templates, said computer adapted to communicate said selected alignment template to said monitor.

12. The device for constructing a photo realistic human talking head according to claim 1, wherein said device for constructing a photo realistic human talking head has a monitor having an input for receiving said output signal of said video camera representational of said collected image of said human subject and an input for receiving said output signal of said mixer representational of said composite image.

13. The device for constructing a photo realistic human talking head according to claim 11, wherein said device for constructing a photo realistic human talking head has a monitor having an input for receiving said output signal of said video camera representational of said collected image of said human subject and an input for receiving said output signal of said mixer representational of said composite image.

14. The device for constructing a photo realistic human talking head according to claim 1, wherein said device for constructing a photo realistic human talking head has a profile camera and video monitor, adapted to monitor profile posture of said human subject.

15. A method of constructing a photo realistic human talking head, comprising at least the following steps:
- selecting an alignment template from a library of alignment templates,
  - each said alignment template being different one from the other and representational of an alignment template frame of a photo realistic human talking head having an alignment template head angular position, comprising a template head tilt, a template head nod, and a template head swivel component,
  - each said alignment template frame different one from the other,
  - each said alignment template head angular position different one from the other;
- substantially aligning a head of a human subject, having a human subject head angular position, comprising a human subject head tilt, a human subject head nod, and a human subject head swivel component, with an image of said selected alignment template head at substantially the same angular position as said selected alignment template head angular position;
- collecting and storing an image of said substantially aligned human subject in a library of collected images, each said collected image having a different human subject angular position, which is substantially the same as a said selected alignment template head angular position, each said stored image representing a different frame of a photo realistic human talking head.

16. The method of constructing a photo realistic human talking head according to claim 15, further comprising:

said collecting comprising collecting said image of said human subject with a video camera;

mixing said collected image of said human subject with said image of said alignment template, creating a composite image of said human subject and said alignment template;

communicating said composite image to a prompter for display to said human subject, said prompter adapted to facilitate said human subject aligning said head of said human subject with said image of said alignment template head.

17. The method of constructing a photo realistic human talking head according to claim 16, further comprising:

capturing different facial characteristics of said substantially aligned human subject head at substantially the same angular position as said selected alignment template head angular position storing images of said different facial characteristics in said library of collected images, each said stored facial characteristic image representing an additional frame of said photo realistic human talking head.

18. The method of constructing a photo realistic human talking head according to claim 16, further comprising:

capturing mouth forms.

19. The method of constructing a photo realistic human talking head according to claim 16, further comprising:

capturing eye forms.

20. The method of constructing a photo realistic human talking head according to claim 16, further comprising:

capturing mouth forms and eye forms.

21. The method of constructing a photo realistic human talking head according to claim 20, further comprising:

capturing additional facial characteristics.

22. The method of constructing a photo realistic human talking head according to claim 16, wherein said prompter has a partially reflecting mirror between said video camera and said human subject, said partially reflecting mirror adapted to display said composite image to said human subject and to facilitate said video camera to collect said image of said human subject.

23. A device for constructing a photo realistic human talking head, comprising:

an alignment template,
said alignment template being representational of an alignment template frame of a photo realistic human talking head having an alignment template head angular position, comprising a template head tilt, a template head nod, and a template head swivel component;
said alignment template having an alignment template image signal;

a video camera,
said video camera collecting an image of a human subject having a head having a human subject head angular position, comprising a human subject head tilt, a human subject head nod, and a human subject head swivel component,
said video camera having an output signal representational of said collected image of said human subject;

a mixer,
said mixer having an input receiving said alignment template image signal and another input receiving said output signal of said video camera representational of said collected image of said human subject,
said mixer mixing said received alignment template image signal and said received output signal of said video camera representational of said collected image of said human subject into a composite image, and
an output signal representational of said composite image;

a prompter,
said prompter having a partially reflecting mirror,
said partially reflecting mirror between said video camera and said human subject,
said prompter having an input receiving said output signal of said mixer representational of said composite image,
said partially reflecting mirror adapted to allow said video camera to collect said image of said human subject therethrough and said human subject to view said composite image and said human subject to align said image of said head of said human subject with said alignment template head at substantially the same angular position as said alignment template head angular position;

storage means,
said storage means having an input receiving said output signal of said video camera representational of said collected image of said human subject,
said storage means storing said collected image video camera output signal of said human subject as a stored image, when said head of said human subject is substantially aligned with said alignment template head,
said collected and stored image having said human subject head angular position substantially the same as said alignment template head angular position
said stored image representing a frame of a photo realistic human talking head.

24. The device for constructing a photo realistic human talking head according to claim 23, wherein said collected image of said human subject further comprises additional collected and stored images of at least one facial characteristic of said head of said human subject corresponding to said alignment template head angular position;

each said stored facial characteristic image representing an additional frame of said photo realistic human talking head.

25. The device for constructing a photo realistic human talking head according to claim 24, wherein said at least one facial characteristic comprises different mouth forms.

26. The device for constructing a photo realistic human talking head according to claim 24, wherein said at least one facial characteristic comprises different eye forms.

27. The device for constructing a photo realistic human talking head according to claim 25, wherein said at least one facial characteristic comprises different eye forms.

28. The device for constructing a photo realistic human talking head according to claim 23, wherein said device for constructing a photo realistic human talking head has a computer having a control program.

29. The device for constructing a photo realistic human talking head according to claim 28, wherein said alignment template has at least one characteristic, said control program is adapted to control said at least one characteristic of said alignment template.

30. The device for constructing a photo realistic human talking head according to claim 28, wherein said collected image of said human subject has at least one characteristic, said control program is adapted to control said at least one characteristic of said collected image of said human subject.

31. The device for constructing a photo realistic human talking head according to claim 29, wherein said collected image of said human subject has at least one characteristic, said control program is adapted to control said at least one characteristic of said collected image of said human subject.

32. The device for constructing a photo realistic human talking head according to claim 23, wherein said device for constructing a photo realistic human talking head has a monitor having an input for receiving said alignment template.

33. The device for constructing a photo realistic human talking head according to claim 32, wherein said device for constructing a photo realistic human talking head has a computer having said alignment template, said computer adapted to communicate said alignment template to said monitor.

34. The device for constructing a photo realistic human talking head according to claim 23, wherein said device for constructing a photo realistic human talking head has a monitor having an input for receiving said output signal of said video camera representational of said collected image of said human subject and an input for receiving said output signal of said mixer representational of said composite image.

35. The device for constructing a photo realistic human talking head according to claim 33, wherein said device for constructing a photo realistic human talking head has a monitor having an input for receiving said output signal of said video camera representational of said collected image of said human subject and an input for receiving said output signal of said mixer representational of said composite image.

36. The device for constructing a photo realistic human talking head according to claim 23, wherein said device for constructing a photo realistic human talking head has a profile camera and video monitor, adapted to monitor profile posture of said human subject.

37. A method of constructing a photo realistic human talking head, comprising at least the following steps:
  substantially aligning a head of a human subject with an image of an alignment template,
    said alignment template being representational of an alignment template frame of a photo realistic human talking head having an alignment template head angular position, comprising a template head tilt, a template head nod, and a template head swivel component,
    said head of said human subject having a human subject head angular position, comprising a human subject head tilt, a human subject head nod, and a human subject head swivel component,
    said human subject substantially aligning said human subject head angular position substantially the same as said selected alignment template head angular position;
  collecting and storing an image of said substantially aligned human subject,
    said collected and stored image having said human subject head angular position substantially the same as said alignment template head angular position,
    said stored image representing a frame of a photo realistic human talking head.

38. The method of constructing a photo realistic human talking head according to claim 37, further comprising:
  said collecting comprising collecting said image of said human subject with a video camera;
  mixing said collected image of said human subject with said image of said alignment template, creating a composite image of said human subject and said alignment template;
  communicating said composite image to a prompter for display to said human subject, said prompter adapted to facilitate said human subject aligning said head of said human subject with said image of said alignment template head.

39. The method of constructing a photo realistic human talking head according to claim 38, further comprising:
  capturing different facial characteristics of said substantially aligned human subject head at substantially the same angular position as said alignment template head angular position
  storing images of said different facial characteristics,
    each said stored facial characteristic representing an additional frame of said photo realistic human talking head.

40. The method of constructing a photo realistic human talking head according to claim 38, further comprising:
  capturing mouth forms.

41. The method of constructing a photo realistic human talking head according to claim 38, further comprising:
  capturing eye forms.

42. The method of constructing a photo realistic human talking head according to claim 38, further comprising:
  capturing mouth forms and eye forms.

43. The method of constructing a photo realistic human talking head according to claim 42, further comprising:
  capturing additional facial characteristics.

44. The method of constructing a photo realistic human talking head according to claim 38, wherein said prompter has a partially reflecting mirror between said video camera and said human subject, said partially reflecting mirror adapted to display said composite image to said human subject and to facilitate said video camera to collect said image of said human subject.

* * * * *